(12) United States Patent
Li

(10) Patent No.: US 11,947,673 B2
(45) Date of Patent: Apr. 2, 2024

(54) OVER-THE-AIR UPGRADE METHOD AND RELATED APPARATUS

(71) Applicant: Huawei Technologies Co., Ltd., Shenzhen (CN)

(72) Inventor: Shubin Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 523 days.

(21) Appl. No.: 17/313,199

(22) Filed: May 6, 2021

(65) Prior Publication Data

US 2021/0256114 A1  Aug. 19, 2021

Related U.S. Application Data

(63) Continuation of application No. PCT/CN2018/114911, filed on Nov. 9, 2018.

(51) Int. Cl.
| | |
|---|---|
| *G06F 21/60* | (2013.01) |
| *G06F 8/658* | (2018.01) |
| *G06F 21/57* | (2013.01) |
| *G06F 21/64* | (2013.01) |
| *H04L 67/00* | (2022.01) |

(52) U.S. Cl.
CPC .............. *G06F 21/57* (2013.01); *G06F 8/658* (2018.02); *G06F 21/602* (2013.01); *G06F 21/64* (2013.01); *H04L 67/34* (2013.01)

(58) Field of Classification Search
None
See application file for complete search history.

(56) References Cited

U.S. PATENT DOCUMENTS

| | | |
|---|---|---|
| 2002/0002703 A1 | 1/2002 | Baentsch et al. |
| 2004/0215755 A1 | 10/2004 | O'Neill |
| 2004/0267833 A1* | 12/2004 | Meller ................ H03M 7/30 |
| 2005/0268296 A1 | 12/2005 | Marolia et al. |
| 2006/0025952 A1 | 2/2006 | Buhr |
| 2007/0022420 A1 | 1/2007 | Yamamoto et al. |
| 2007/0219915 A1 | 9/2007 | Hatano et al. |
| 2008/0189695 A1 | 8/2008 | Andersson et al. |
| 2010/0031035 A1 | 2/2010 | Princen et al. |

(Continued)

FOREIGN PATENT DOCUMENTS

| | | | |
|---|---|---|---|
| CN | 102902555 A | | 1/2013 |
| CN | 103825925 A | * | 5/2014 |

(Continued)

*Primary Examiner* — Joseph P Hirl
*Assistant Examiner* — Hassan Saadoun
(74) *Attorney, Agent, or Firm* — Conley Rose, P.C.

(57) ABSTRACT

An over-the-air (OTA) upgrade method includes obtaining, by a server, a new version of encrypted data and an old version of encrypted data of system software applied to a mobile terminal, decrypting, by the server, the new version of encrypted data to obtain a new version of original data, decrypting, by the server, the old version of encrypted data to obtain an old version of original data, performing, by the server, differentiation on the new version of original data and the old version of original data to obtain differential data, generating, by the server, OTA data based on the differential data, and sending, by the first server, the OTA data to the mobile terminal.

20 Claims, 18 Drawing Sheets

(56) References Cited

U.S. PATENT DOCUMENTS

| | | | |
|---|---|---|---|
| 2013/0111455 A1* | 5/2013 | Li | ..................... H04L 9/3239 |
| | | | 717/169 |
| 2015/0012750 A1 | 1/2015 | Matsumoto et al. | |
| 2016/0321063 A1 | 11/2016 | Yang | |
| 2018/0204008 A1* | 7/2018 | Djabarov | ................ H04L 67/34 |

FOREIGN PATENT DOCUMENTS

| | | | | | |
|---|---|---|---|---|---|
| CN | 103825925 A | | 5/2014 | | |
| CN | 104239110 A | | 12/2014 | | |
| CN | 105573785 A | | 5/2016 | | |
| CN | 105933150 A | * | 9/2016 | ............... | G06F 8/65 |
| CN | 105933150 A | | 9/2016 | | |
| CN | 106250143 A | | 12/2016 | | |
| CN | 106250143 A | * | 12/2016 | | |
| CN | 106886424 A | | 6/2017 | | |
| CN | 107391145 A | | 11/2017 | | |
| CN | 108023724 A | | 5/2018 | | |
| DE | 10254320 A1 | | 6/2004 | | |
| JP | H08106412 A | | 4/1996 | | |
| JP | 2002116838 A | | 4/2002 | | |
| JP | 2004514214 A | | 5/2004 | | |
| JP | 2006080658 A | | 3/2006 | | |
| JP | 2007026244 A | | 2/2007 | | |
| JP | 2007251921 A | | 9/2007 | | |
| JP | 2010507328 A | | 3/2010 | | |
| JP | 2010218070 A | | 9/2010 | | |
| JP | 2013534377 A | | 9/2013 | | |
| JP | 2015014910 A | | 1/2015 | | |
| JP | 2015142301 A | | 8/2015 | | |
| KR | 20080019454 A | | 3/2008 | | |
| WO | 1996002992 A1 | | 2/1996 | | |
| WO | 2018092289 A1 | | 5/2018 | | |

\* cited by examiner

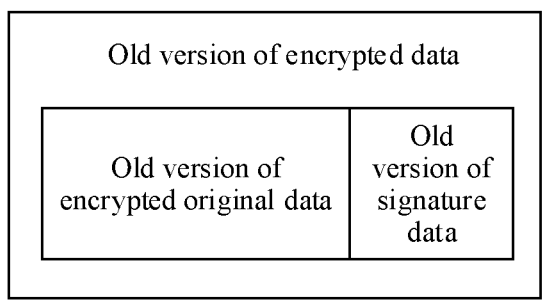
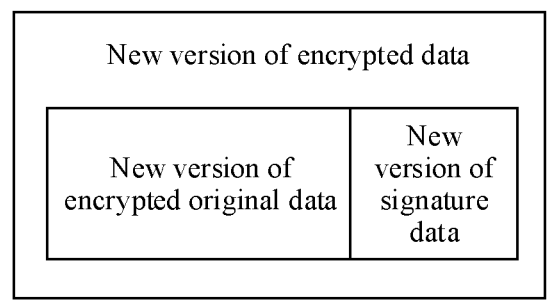
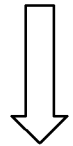
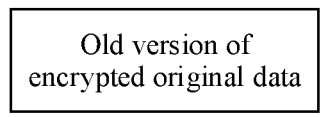
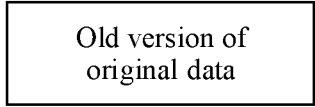
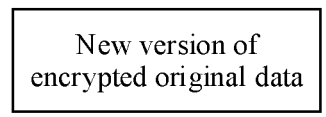
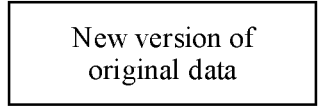
FIG. 7A                                      FIG. 7B

OVER-THE-AIR UPGRADE METHOD AND RELATED APPARATUS

CROSS-REFERENCE TO RELATED APPLICATIONS

This application is a continuation of International Patent Application No. PCT/CN2018/114911 filed on Nov. 9, 2018, which is incorporated herein by reference in its entirety.

TECHNICAL FIELD

This application relates to the field of communications technologies, and in particular, to an over-the-air (OTA) upgrade method and a related apparatus.

BACKGROUND

Users of mobile terminals increase rapidly, and requirements for emerging communications technologies and mobile terminals are also increasingly high. Mobile terminals are also more intelligent and multimedia-based, and are usually installed with various system software. Although such mobile terminals have richer functions, the system software is also more prone to generate vulnerabilities. Therefore, application software of the mobile terminals needs to be upgraded and updated.

An OTA technology is applied to system software upgrade and update of a mobile terminal because system software of the mobile terminal can be remotely managed through an air interface of a server. An OTA upgrade manner is mainly performing upgrade in a client/server mode. The mobile terminal may download an OTA upgrade package from the server to upgrade the system software on the mobile terminal. If a data volume of the OTA upgrade package is excessively large, when no WI-FI is configured on the mobile terminal, traffic becomes a problem that a user worries about. In addition, when the data volume of the OTA upgrade package is excessively large, problems such as an incomplete OTA upgrade package downloaded by the mobile terminal and an update upgrade failure may occur.

Therefore, how to reduce a size of the OTA upgrade package becomes a technical problem to be urgently resolved by persons skilled in the art.

SUMMARY

This application provides an OTA upgrade method and a related apparatus, to reduce a size of an OTA upgrade package, and implement fast upgrade of system software on a mobile terminal.

According to a first aspect, this application provides an OTA data sending method that includes a first server obtains a new version of encrypted data and an old version of encrypted data of system software applied to a mobile terminal. Then, the first server decrypts the new version of encrypted data to obtain a new version of original data, and decrypts the old version of encrypted data to obtain an old version of original data. Next, the first server performs differentiation on the new version of original data and the old version of original data, to obtain differential data. The differential data includes data that is in the new version of original data and that is different from the old version of original data. Next, the first server generates OTA data. The OTA data includes differential encrypted data and header information, and the differential encrypted data is data obtained after the differential data is encrypted, or the differential encrypted data is data obtained after the differential data is encrypted and signed. The header information includes differential data encryption header information, or the header information includes differential data encryption header information and destination data encryption header information. The differential data encryption header information is used by the mobile terminal to decrypt the differential encrypted data to obtain the differential data, and the destination data encryption header information is used by the mobile terminal to verify a signature of the differential encrypted data. Finally, the first server sends the OTA data to the mobile terminal. The OTA data is used to upgrade an old version (for example, version 8.1 of an EMUI system) of the system software of the mobile terminal to a new version (for example, version 8.2 of the EMUI system).

The first server in this embodiment of this application is an OTA server. According to this embodiment of this application, when producing the OTA data, the first server (the OTA server) may produce the differential data based on the old version of original data and the new version of original data that are obtained through decryption, and send the OTA data including the differential data to the mobile terminal. Because the OTA server performs differentiation on only the new version of original data and the old version of original data, signature data of the new version of original data is removed from the differential data, so that a size of data transmitted by the OTA server to the mobile terminal for system software upgrade is reduced, and fast upgrade of the system software is implemented.

In an implementation, that the first server generates OTA data includes, the first server encrypts the differential data to obtain the differential encrypted data, or encrypts and signs the differential data to obtain the differential encrypted data. Then, the first server generates the header information for the differential encrypted data. Next, the first server integrates the differential encrypted data and the header information to obtain the OTA data.

In an implementation, before the first server obtains the new version of encrypted data and the old version of encrypted data of the system software applied to the mobile terminal, the method further includes, the first server receives an old version of information that is of the system software and that is sent by the mobile terminal, and then, the first server determines the old version of encrypted data from one or more historical versions of encrypted data of the system software based on the old version of information of the system software. Because the first server may have a plurality of historical versions of data of the system software, by receiving the old version of information sent by the mobile terminal, the first server can determine the old version of encrypted data from the plurality of historical versions of data, and produce the differential data on the old version, to ensure correctness of the differential data used for system software upgrade on the mobile terminal.

In an implementation, that the first server decrypts the new version of encrypted data to obtain a new version of original data, and decrypts the old version of encrypted data to obtain an old version of original data includes, the first server removes signature data from the new version of encrypted data, to obtain a new version of encrypted original data, the first server removes signature data from the old version of encrypted data, to obtain an old version of encrypted original data, and the first server decrypts the new version of encrypted original data to obtain the new version of original data, and decrypts the old version of encrypted original data to obtain the old version of original data. The signature data in the new version of encrypted data increases as the new version of original data increases. In this way, after the signature data is removed, and a data volume of the differential data is reduced, so that a size of data transmitted by the OTA server to the mobile terminal for system software upgrade is reduced, and fast upgrade of the system software is implemented.

In an implementation, the old version of original data includes an old version of file data block, an old version of hash data block, and an old version of check data block. The new version of original data includes a new version of file data block, a new version of hash data block, and a new version of check data block. The old version of check data block is signature data of a root hash value in the old version of hash data block, and the old version of hash data block is used to check the old version of file data block. The new version of check data block is signature data of a root hash value in the new version of hash data block, and the new version of hash data block is used to check the new version of file data block. That the first server performs differentiation on the old version of original data and the new version of original data, to obtain the differential data includes First, the first server removes the old version of hash data block from the old version of original data, and removes the new version of hash data block from the new version of original data. Then, the first server performs data block-based differentiation based on the old version of original data from which the old version of hash data block is removed and the new version of original data from which the new version of hash data block is removed, to obtain the differential data. In this way, when producing the differential data, the first server (the OTA server) removes data blocks corresponding to a hash tree, and retains the new version of check data block and the new version of file data block, and then when the mobile terminal restores the differential data, by using a check random value in the restored new version of file data block and new version of check data block, a hash data block corresponding to the new version of file data block is generated to be stored in a storage medium. Because the new version of hash data block is removed from the OTA data, and the new version of hash data block generated on the mobile terminal is used, to reduce a data volume of system software update data (OTA data) released by the first server.

According to a second aspect, this application provides an OTA upgrade method, including First, a mobile terminal receives OTA data sent by a first server. The OTA data is used to upgrade an old version (for example, version 8.1 of an EMUI system) of system software (for example, the EMUI system) on the mobile terminal to a new version (for example, version 8.2 of the EMUI system). The OTA data includes header information and differential encrypted data, and the header information includes differential data encryption header information, or the header information includes differential data encryption header information and destination data encryption header information. The differential data encryption header information is used by the mobile terminal to obtain differential data through decryption, and the destination data encryption header information is used by the mobile terminal to verify a signature of the differential encrypted data. The differential encrypted data is data obtained after the differential data is encrypted, or the differential encrypted data is data obtained after the differential data is encrypted and signed. Then, the mobile terminal decrypts the differential encrypted data based on the differential data encryption header information, to obtain the differential data. Next, the mobile terminal obtains an old version of original data of the system software. Next, the mobile terminal integrates a new version of original data based on the differential data and the old version of original data. Finally, the mobile terminal upgrades the old version of the system software to the new version by using the new version of original data.

The first server in this embodiment of this application is an OTA server. According to this embodiment of this application, when producing the OTA data, the first server (namely, the OTA server) may produce the differential data based on the old version of original data and the new version of original data that are obtained through decryption, and send the OTA data including the differential data to the mobile terminal. The mobile terminal decrypts the OTA data to obtain the differential data and the locally stored old version of original data, and integrates the differential data and the old version of original data to obtain the new version of original data. Because the OTA server performs differentiation on only the new version of original data and the old version of original data, signature data of the new version of original data is removed from the differential data, so that a size of the OTA data is reduced, and fast upgrade of the system software on the mobile terminal is implemented.

In an implementation, before the mobile terminal receives the OTA data sent by the first server, the method further includes the mobile terminal sends an old version of information of the system software to the first server. The old version of information of the system software is used by the first server to determine an old version of encrypted data from one or more historical versions of encrypted data. In other words, because the first server may have a plurality of historical versions of data of the system software, the mobile terminal sends the old version of information to the first server, so that the first server can determine the old version of encrypted data from the plurality of historical versions of data, and produce the differential data on the old version, to ensure that the differential data is produced based on the old version of the system software on the mobile terminal and a new version newly released by a vendor, and ensure correctness of the differential data used for system software upgrade.

In an implementation, the mobile terminal includes a trusted execution environment (TEE) and a rich execution environment (REE). A trusted application TA runs in the TEE, and a first client application (CA) and an update application run in the REE.

In an implementation, that the mobile terminal decrypts the differential encrypted data based on the differential data encryption header information, to obtain the differential data includes, the update application extracts the differential encrypted data and the differential data encryption header information from the OTA data. The differential data encryption header information includes an encryption algorithm of the differential encrypted data and an encrypted random value used during encryption. Then, the update application forwards the differential encrypted data, the encryption algorithm of the differential encrypted data, and the encrypted random value used during encryption to the TA by using the first CA. Finally, the TA decrypts the differential encrypted data based on the differential data encryption header information, to obtain the differential data. In this way, the mobile terminal decrypts the differential encrypted data by using the TA in the TEE, to obtain the differential data, to ensure security of the differential encrypted data.

In an implementation, when the header information includes the differential data encryption header information and the destination data encryption header information, before the mobile terminal integrates a new version of original data based on the differential data and the old version of original data, the method further includes, the update application extracts the destination data encryption header information from the header information, where the destination data encryption header information includes message digest algorithm information of the differential encrypted data and encryption algorithm information used for signature. Then, the update application forwards the message digest algorithm information of the differential encrypted data and the encryption algorithm information used for signature to the TA by using the first CA. Finally, the TA verifies the signature of the differential encrypted data based on signature information. If the verification succeeds, the mobile terminal integrates the new version of original data based on the differential data and the old version of original data. In this way, before the TA integrates the new version of original data based on the differential data and the old version of original data, the TA first verifies the signature of the differential encrypted data, to determine that the differential encrypted data has not been modified. This ensures integrity of the differential data used to integrate the new version of original data.

In an implementation, that the mobile terminal obtains an old version of original data of the system software includes the update application forwards an old version of encrypted data of the system software to the TA by using the first CA. The TA decrypts the old version of encrypted data to obtain the old version of original data. In this way, the old version of encrypted data is decrypted by using the TA, to ensure security in the decryption process of the old version of encrypted data.

In an implementation, the method further includes the TA sends the old version of original data and the differential data to the first CA. That the mobile terminal integrates a new version of original data based on the differential data and the old version of original data includes the first CA integrates the new version of original data based on the old version of original data and the differential data. In this way, the process of integrating the new version of original data based on the differential data and the old version of original data is performed by the first CA, so that the first CA can share a part of a data processing task of the TA, to improve a speed of system software upgrade on the mobile terminal while ensuring data security in a system software upgrade process.

In an implementation, the old version of original data includes an old version of file data block, an old version of hash data block, and an old version of check data block. The old version of check data block is signature data of a root hash value in the old version of hash data block, and the old version of hash data block is used to check the old version of file data block.

That the TA integrates the new version of original data based on the differential data and the old version of original data includes, the TA integrates a new version of file data block and a new version of check data block based on the differential data and the old version of original data, and then, the TA calculates a hash tree of the new version of file data block, and generates a new version of hash data block, to obtain the new version of original data. The new version of original data includes a new version of file data block, a new version of hash data block, and a new version of check data block. The new version of check data block is signature data of a root hash value in the new version of hash data block, and the new version of hash data block is used to check the new version of file data block. In this way, when producing the differential data, the first server (the OTA server) removes data blocks corresponding to a hash tree, and retains the new version of check data block and the new version of file data block, and then when the mobile terminal restores the differential data, the first server (the OTA server) generates, by using a check random value in the restored new version of file data block and new version of check data block, a hash data block corresponding to the new version of file data block, and stores the hash data block into a storage medium. The new version of hash data block is removed from the OTA data, and the new version of hash data block generated on the mobile terminal is used, to reduce a data volume of system software update data (OTA data) released by the first server.

According to a third aspect, this application provides a server, including a memory, a transceiver, and at least one processor. The memory stores program code. The memory, the transceiver, and the at least one processor communicate with each other. The processor runs the code to instruct the server to perform the OTA data sending method according to the first aspect or any possible implementation of the first aspect.

According to a fourth aspect, this application provides a mobile terminal, including a memory, a transceiver, and at least one processor. The memory stores program code. The memory, the transceiver, and the at least one processor communicate with each other. The processor runs the code to instruct the mobile terminal to perform the OTA upgrade method according to the second aspect or any possible implementation of the second aspect.

According to a fifth aspect, an embodiment of this application provides a computer readable storage medium, including computer instructions. When the computer instructions are run on a server, the server performs the OTA data sending method according to the first aspect or any possible implementation of the first aspect.

According to a sixth aspect, an embodiment of this application provides a computer readable storage medium, including computer instructions. When the computer instructions are run on a mobile terminal, the mobile terminal performs the OTA data sending method according to the second aspect or any possible implementation of the second aspect.

BRIEF DESCRIPTION OF DRAWINGS

FIG. 7A and FIG. 7B are a schematic flowchart of extracting data according to an embodiment of this application;

DESCRIPTION OF EMBODIMENTS

The technical solutions in embodiments of this application are clearly described in detail in the following with reference to the accompanying drawings. In the descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the embodiments of this application, unless otherwise specified, "a plurality of" means two or more than two.

Figure 1:
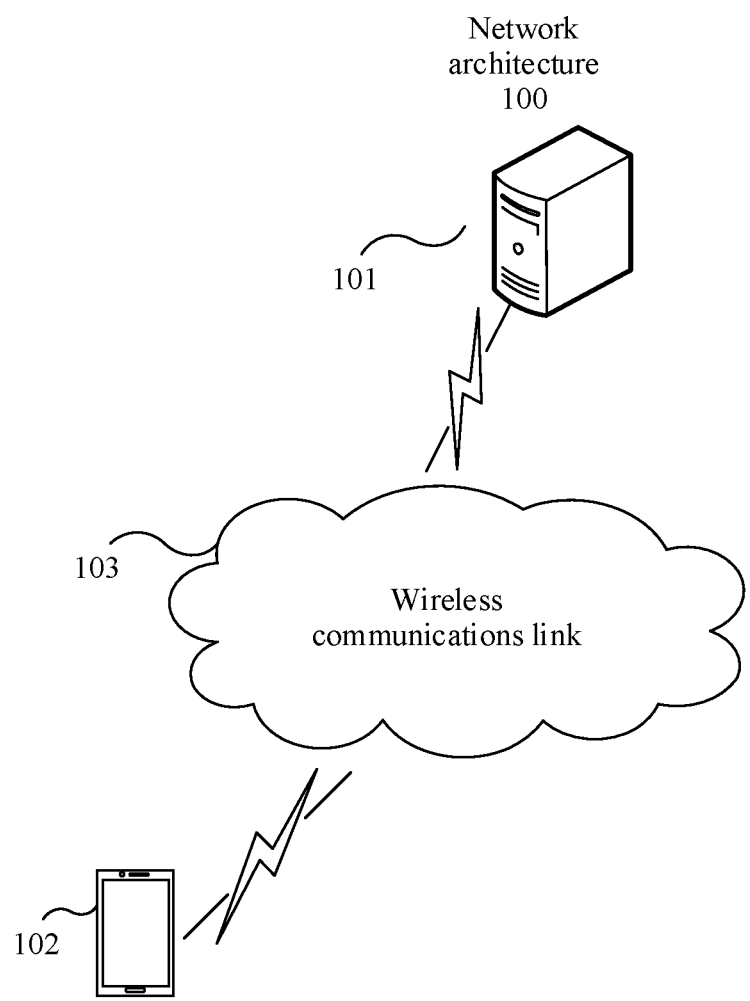
FIG. 1 is a schematic diagram of a system architecture according to an embodiment of this application.

Referring to FIG. 1, FIG. 1 is a diagram of a network architecture according to an embodiment of this application. As shown in FIG. 1, the network architecture 10 may include an OTA server 300, a mobile terminal 200, and a wireless communications link. For example, the mobile terminal 200 may communicate with the OTA server 300 by using a mobile communications network (for example, a second generation (2G)\third generation (3G)\fourth generation (4G)\fifth generation (5G) network), or may communicate with the OTA server 300 by using a wireless local area network (WLAN).

The mobile terminal 200 may include but is not limited to a personal computer, a smartphone, a smart television (TV), a tablet computer, a personal digital assistant, or the like.

Figure 2:
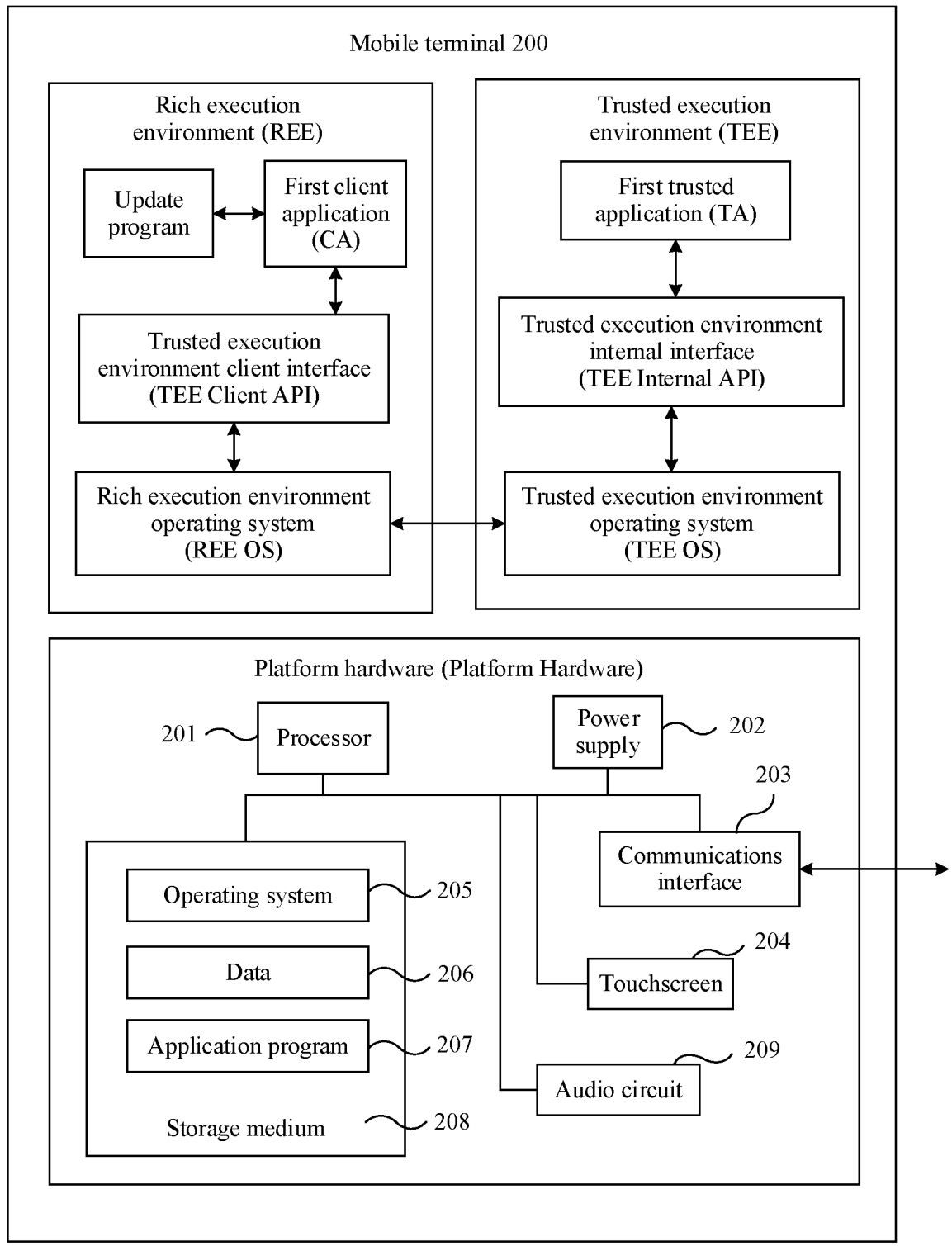
FIG. 2 is a schematic structural diagram of a mobile terminal according to an embodiment of this application.

Referring to FIG. 2, FIG. 2 is a schematic structural diagram of a TEE of a mobile terminal according to an embodiment of this application. The mobile terminal 200 may include two application environments a REE and a TEE. An application running in the REE may be referred to as a CA, and the CA in the REE may include an update application and a first CA. An application running in the TEE may be referred to as a trusted application (TEE application (TA)). The update application may be configured to upload a version number of system software on the mobile terminal to the OTA server, and download, from the OTA server, OTA data used for system software upgrade. The first CA may be used to provide a data forwarding function to the update application and the TA, to implement indirect communication of the update application in the TA. The TA may be used for encryption, decryption, signature, difference restoration and the like for data. An operating system running in the REE may be referred to as a REE operating system (REE OS), and an operating system running in the TEE may be referred to as a TEE operating system (TEE OS). The TEE is a secure operating environment running in a main processor. A secure boot process of the TEE needs to be verified, and the secure boot process of the TEE is separated from the REE. Application programs running in the TEE are independent of each other, and the application programs cannot access each other without authorization, to ensure that processing of resources and data of the application programs in the TEE is performed in a trusted environment, thereby providing a secure service for the REE operating system. The TEE has its own execution space, and has a higher security level than the REE operating system. In addition, the TEE is not an independent physical security chip, but a security architecture that overlaps a hardware architecture of a currently used application processor. Software and hardware resources that can be accessed by the TEE are separated from the REE operating system to provide hardware support isolation. A TEE client interface (TEE client application programming interface (API)) and a TEE internal interface (TEE internal API) may respectively use a TEE client API V1.0 standard and a TEE internal API V1.0 standard.

The first CA and the TA share a memory. If the first CA needs to communicate with the TA, the first CA may apply to the TEE OS to establish a session with the requested TA. After the session establishment between the first CA and the TA is completed, the first CA may send a processing request and data that needs to be processed to the TA by using the shared memory. After obtaining the processing request and the data that needs to be processed of the first CA from the shared memory, the TA may execute the processing request in the TEE environment, and store an obtained processing result into the shared memory. The first CA may obtain the processing result of the TA from the shared memory. After the first CA obtains the processing result, if the TA does not need to continue processing, the first CA may initiate a close session request to the TEE OS. After receiving the close session request, the TEE OS may reclaim related resources of the TA.

Platform hardware of the mobile terminal 200 may include a processor 201, a power supply 202, a communications interface 203, a touchscreen 204, a storage medium 208, and an audio circuit 209. The storage medium 208 is configured to store an operating system 205, data 206, and an application program 207 of the mobile terminal 200. For example, a protected area in the storage medium 208 may store a TEE OS and an application (TA) in the TEE. An unprotected area in the storage medium 208 may store an REE OS and an application (CA) in the REE. The application program 207 includes a CA in the REE and a TA in the TEE. The operating system 205 includes an REE OS and a TEE OS. The REE OS may include an operating system such as an ANDROID system and an EMUI system. The data 206 may include OTA data, version encrypted data of system software, and the like in this embodiment of this application. The processor 201 may be a central processing unit (CPU), a general-purpose processor, a digital signal processor (DSP), an application-specific integrated circuit (ASIC), a field-programmable gate array (FPGA), or another programmable logical device, a transistor logical device, a hardware component, or any combination thereof.

The storage medium 208 may include a high-speed random-access memory (RAM), and may further include a non-volatile memory, for example, at least one flash memory device, or another volatile solid-state storage device. Programs and received data streams of the OTA upgrade method provided in this embodiment of this application are stored in the memory, and may be invoked from the storage medium 208 by the processor 201 when required to be used.

The mobile terminal 200 may further include the communications interface 203, the touchscreen 204, and the audio circuit 209. The communications interface 203 may be used by the mobile terminal 200 to communicate with the server 300 or another terminal. The audio circuit 209 may be configured to convert digital audio information into an analog audio signal for output, or may be configured to convert an analog audio input into a digital audio signal. The audio circuit 209 may be further configured to encode and decode an audio signal. In some embodiments, the audio circuit 209 may be disposed in the processor 201, or some function modules of the audio circuit 209 may be disposed in the processor 201. The touchscreen 204 may include a touch sensor and a display screen. The touch sensor may transfer a detected touch operation to the processor 201, to determine a touch event type. A visual output related to the touch operation may be provided through the display screen. In some embodiments, the touch sensor may alternatively be disposed on a surface of the mobile terminal 200, and is at a position different from that of the display screen. Persons skilled in the art may understand that the server structure shown in FIG. 2 should not constitute a limitation. In specific implementation, the server may include more or fewer components than the mobile terminal 200 shown in FIG. 2, or combine some components, or have different component arrangements.

Figure 3:
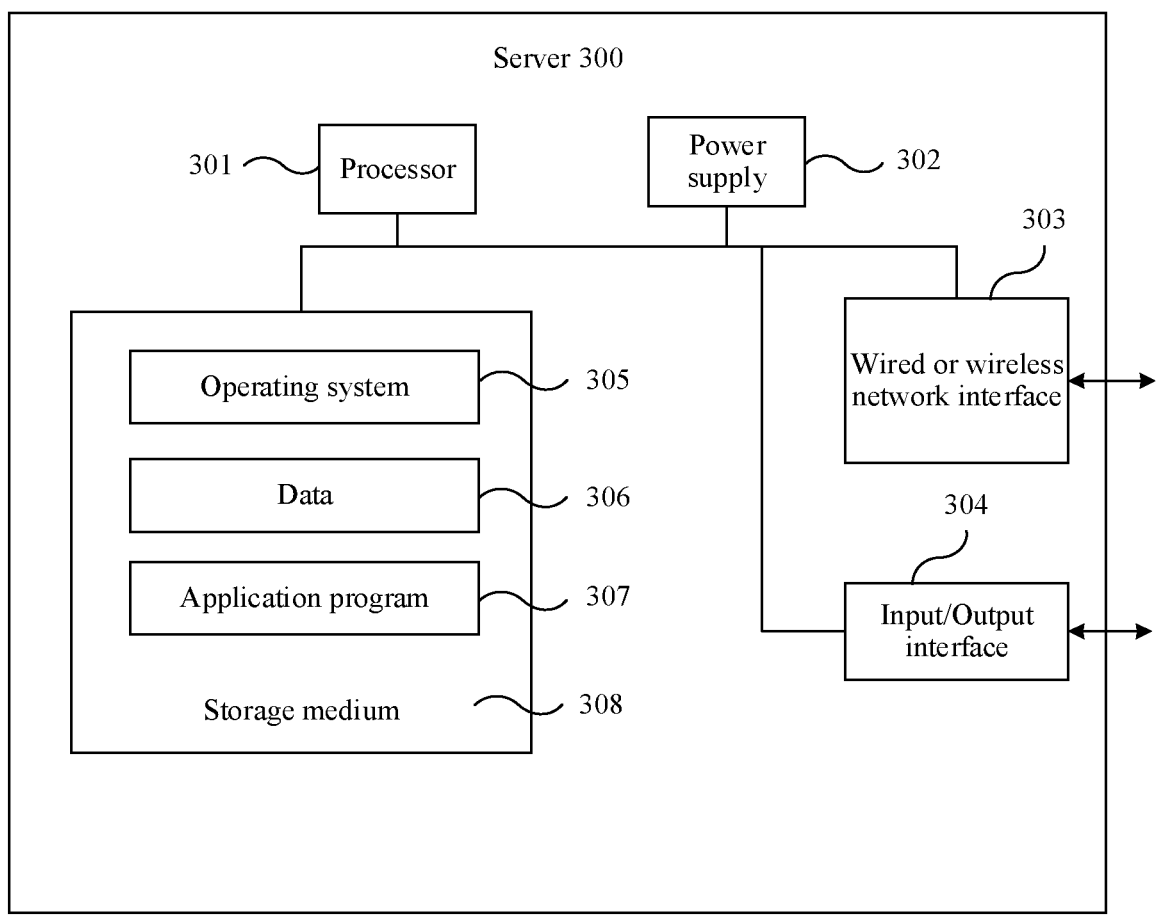
FIG. 3 is a schematic structural diagram of an OTA server according to an embodiment of this application.

Referring to FIG. 3, FIG. 3 is a schematic structural diagram of a server according to an embodiment of this application. As shown in FIG. 3, the server 300 may include one or more processors 301 (for example, a CPU) and a storage medium 308. The storage medium 308 may store one or more application programs 307, data 306, and an operating system 305. The data 306 may include version data of system software involved in the OTA upgrade method provided in this embodiment of this application, for example, data such as an old version of encrypted data and a new version of encrypted data of the system software, and OTA data generated based on the old version of encrypted data and the new version of encrypted data. The storage medium 308 may be temporary storage or persistent storage. The processor 301 may be configured to communicate with the storage medium 308.

The storage medium 308 may be configured to store a software program and a module. The processor 301 executes various function applications and data processing of the OTA server 300 by running the software program and the module stored in the storage medium 308. The storage medium 308 may mainly include a program storage area and a data storage area. The program storage area may store an operating system, an application program required by at least one function, and the like. The data storage area may store data created based on use of the OTA server (for example, a data upload command), and the like. In addition, the storage medium 308 may include a high-speed RAM, and may further include a non-volatile memory, for example, at least one magnetic disk storage device, a flash memory device, or another volatile solid-state storage device. Programs and received data streams in the OTA upgrade method provided in this embodiment of this application are stored in the memory, and are invoked from the storage medium 308 by the processor 301 when required to be used.

The OTA server 300 may further include one or more power supplies 302, one or more wired or wireless network interfaces 303, one or more input/output interfaces 304, and/or one or more operating systems 305, for example, WINDOWS SERVER, MAC OS X, UNIX, LINUX, and FREEBSD. Persons skilled in the art may understand that the server structure shown in FIG. 3 should not constitute a limitation. In specific implementation, the server may include more or fewer components than the server shown in FIG. 3, or combine some components, or have different component arrangements.

The mobile terminal described in this embodiment of this application may be a mobile terminal that has security environments of both the REE and the TEE, such as a smartphone, a smart TV, a tablet computer, or a personal digital assistant In an OTA upgrade process in the related art, because a vendor of system software needs to ensure security of version data of the system software in a system software upgrade process, a sender of the version data needs to encrypt and sign the version data before sending the version data to a receiver of the version data. Therefore, each time a terminal of the vendor generates one version of the system software, the terminal needs to encrypt and sign version data of the system software, to ensure security of the version data of the system software. The version data of the system software obtained from the terminal of the vendor by the OTA server is encrypted and signed. The OTA server stores various versions of encrypted data of the system software (including a new version of encrypted data and a plurality of historical versions of encrypted data). The OTA server determines, based on a current version number of the system software on the mobile terminal, an old version of encrypted data that is consistent with the current version number from the plurality of historical versions of encrypted data stored on the OTA server. The OTA server performs differentiation directly on the old version of encrypted data and the new version of encrypted data to obtain a difference result. Differentiation may be directly performed on an old version of encrypted data and a new version of encrypted data of a non-compressed file class by using a binary difference (bsdiff) algorithm, and differentiation may be performed an old version of encrypted data and a new version of encrypted data of a compressed file class by using an imgdiff algorithm. The difference result is sent to the mobile terminal. After receiving the difference result, the mobile terminal restores the new version of encrypted data of the system software by using the difference result and the old version of encrypted data corresponding to the current version number of the system software, and stores the new version of encrypted data into the storage medium of the mobile terminal.

Figure 4A:
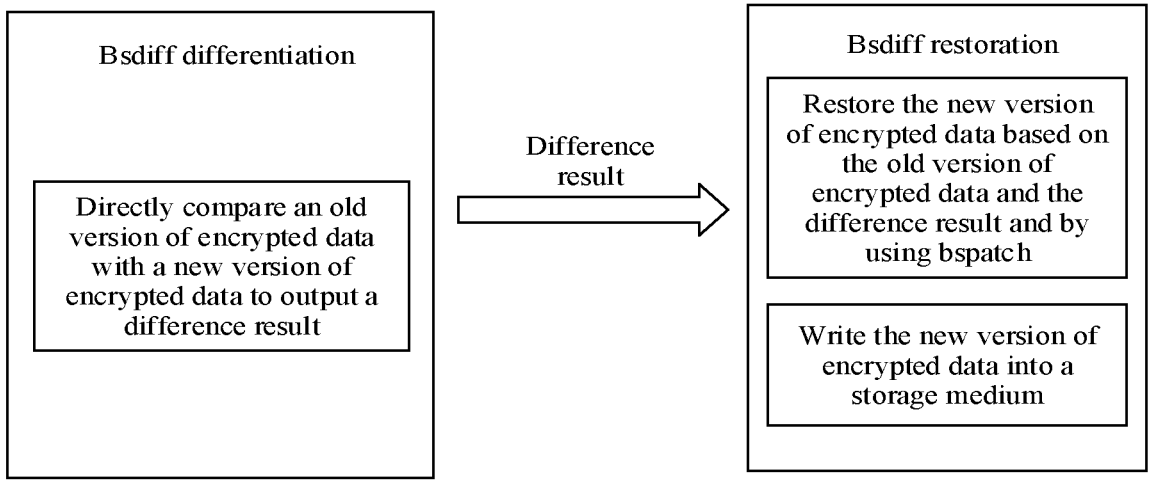
FIG. 4A is a schematic flowchart of a difference algorithm according to an embodiment of this application.

As shown in FIG. 4A, when performing differentiation on the old version of encrypted data and the new version of encrypted data of the non-compressed file class by using the bsdiff algorithm, the OTA server may directly compare the old version of encrypted data and the new version of encrypted data to output a difference result. The OTA server sends the difference result to the mobile terminal. After receiving the difference result, the mobile terminal may restore the new version of encrypted data by using a bspatch algorithm based on the old version of encrypted data stored on the mobile terminal and the received difference result, and write the restored new version of encrypted data into the storage medium.

Figure 4B:
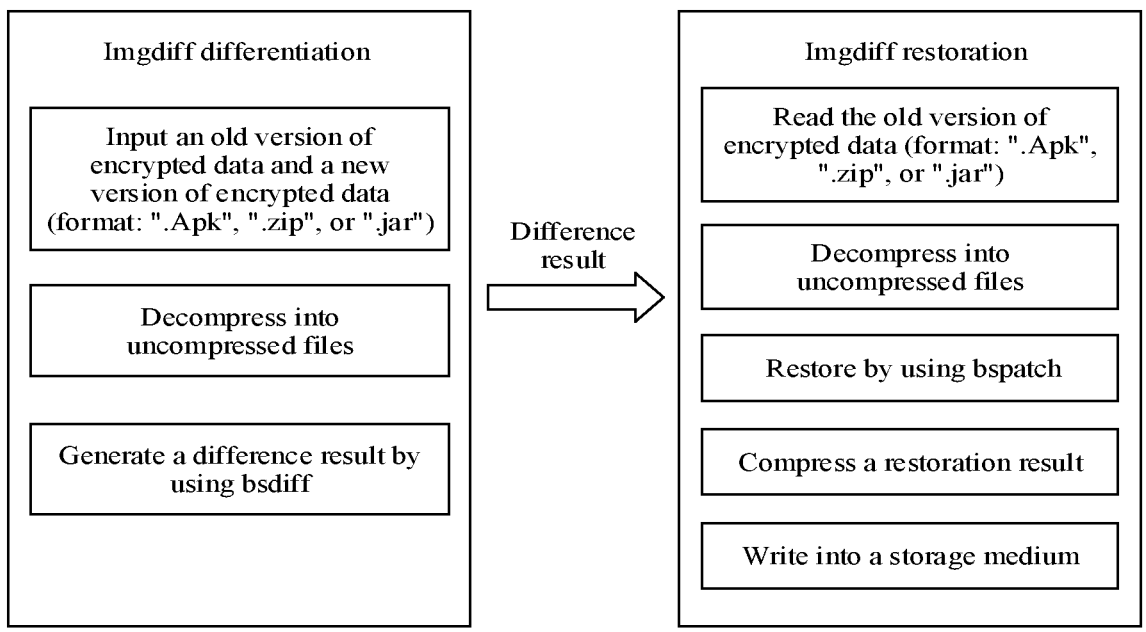
FIG. 4B is a schematic flowchart of another difference algorithm according to an embodiment of this application.

As shown in FIG. 4B, when performing differentiation on the old version of encrypted data and the new version of encrypted data of the compressed class file class (a compressed format may be ".Apk", ".zip", or ".jar") by using the imgdiff algorithm, the OTA server may first decompress the old version of encrypted data and the new version of encrypted data of the compressed file class into uncompressed files, and then generate a difference result by using the bsdiff algorithm. The OTA server sends the difference result to the mobile terminal. After receiving the difference result, the mobile terminal may first read the old version of encrypted data of the compressed file class stored on the mobile terminal, and decompress the old version of encrypted data into uncompressed files. Then, the OTA server restores the new version of encrypted data by using a bspath algorithm based on the old version of encrypted data and the difference result, and writes the restored new version of encrypted data into the storage medium.

Because the old version of encrypted data includes ciphertext data obtained after an old version of original data of the system software is encrypted and signature data in the old version of original data (including a character string obtained after a digest of the old version of original data is encrypted), the new version of encrypted data includes ciphertext data obtained after a new version of original data of the system software is encrypted and signature data in the new version of original data (including a character string obtained after a digest of the new version of original data is encrypted). A larger old version of original data indicates a larger digest of the old version of original data. Similarly, a larger new version of original data indicates a larger digest of the new version of original data. Therefore, when performing differentiation directly on the old version of encrypted data and the new version of encrypted data, the OTA server also performs differentiation on the digest of the old version of original data and the digest of the new version of original data. Because the digest of the old version of original data is different from the digest of the new version of original data, the differential data includes some data that is in the new version of original data and that is different from the old version of original data, and the signature data of the new version of original data.

However, the mobile terminal can restore the new version of original data only by using some different data in the differential data and the old version of original data of the system software stored on the mobile terminal, and when transmitting the differential data to the mobile terminal, the OTA server transmits not only some different data, but also transmit the signature data of the new version of original data. The signature data of the new version of original data also needs to occupy a data volume of some update packages. A larger new version of original data indicates larger signature data of the new version of original data. Therefore, even if some different data between the old version of original data and the new version of original data is relatively small, data sent by the OTA server to the mobile terminal for system software upgrade also includes relatively large signature data of the new version of original data, time for downloading data used for system software upgrade by the mobile terminal is consumed, and user experience is adversely affected.

Figure 5A:
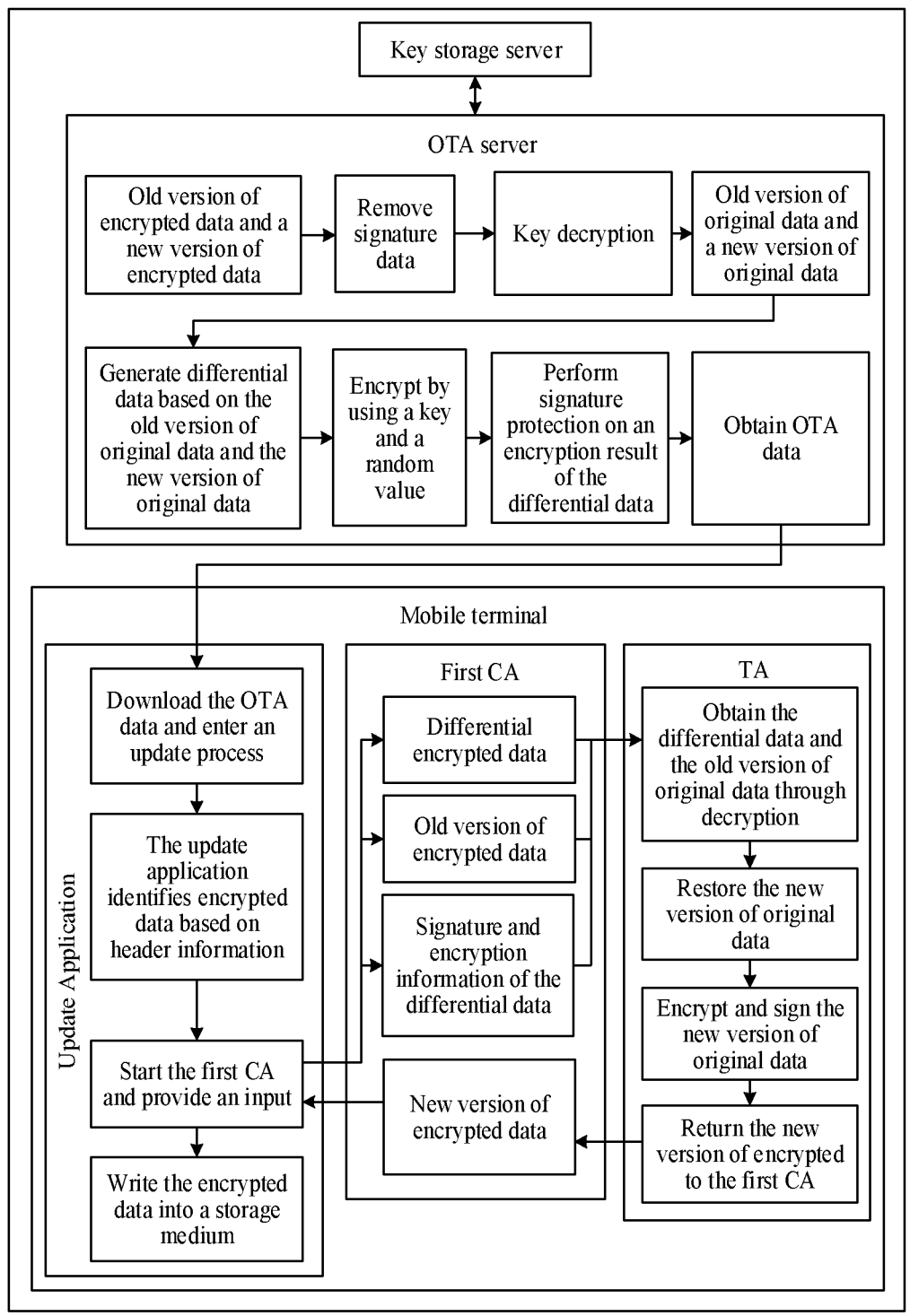
FIG. 5A is a schematic flowchart of an OTA upgrade method according to an embodiment of this application.

For this reason, referring to FIG. 5A, FIG. 5A is a schematic flowchart of an OTA upgrade method according to an embodiment of this application. As shown in FIG. 5A, an old version of encrypted data includes ciphertext data obtained after an old version of original data of system software is encrypted and signature data in the old version of original data (including a character string obtained after a digest of the old version of original data is encrypted), and a new version of encrypted data includes ciphertext data obtained after a new version of original data of the system software is encrypted and signature data in the new version of original data (including a character string after a digest of the new version of original data is encrypted). An OTA server may remove signature data in the old version of encrypted data and signature data in the new version of encrypted data, and obtain a key from a key storage server to obtain the old version of original data and the new version of original data through decryption. Then, the OTA server may perform differentiation on the old version of original data and the new version of original data, to generate differential data. Next, the OTA server encrypts the differential data by using the key on the key storage server and an encrypted random value, and performs signature protection on an encrypted result to obtain OTA data. The OTA server may send the OTA data to a mobile terminal.

After the mobile terminal downloads the OTA data, after an update application on the mobile terminal identifies that the OTA data is encrypted data, a first CA may be started, and differential encrypted data in the OTA data, an old version of encrypted data locally stored in the mobile terminal, and signature information and encryption information of the differential data are forwarded to a first TA by using the first CA. The first TA may decrypt the old version of encrypted data and the differential encrypted data, and restore the new version of original data. The first TA encrypts and signs the new version of original data, to generate the new version of encrypted data, and forwards the new version of encrypted data to the update application by using the first CA. The update application writes the new version of encrypted data into a storage medium.

Figure 5B:
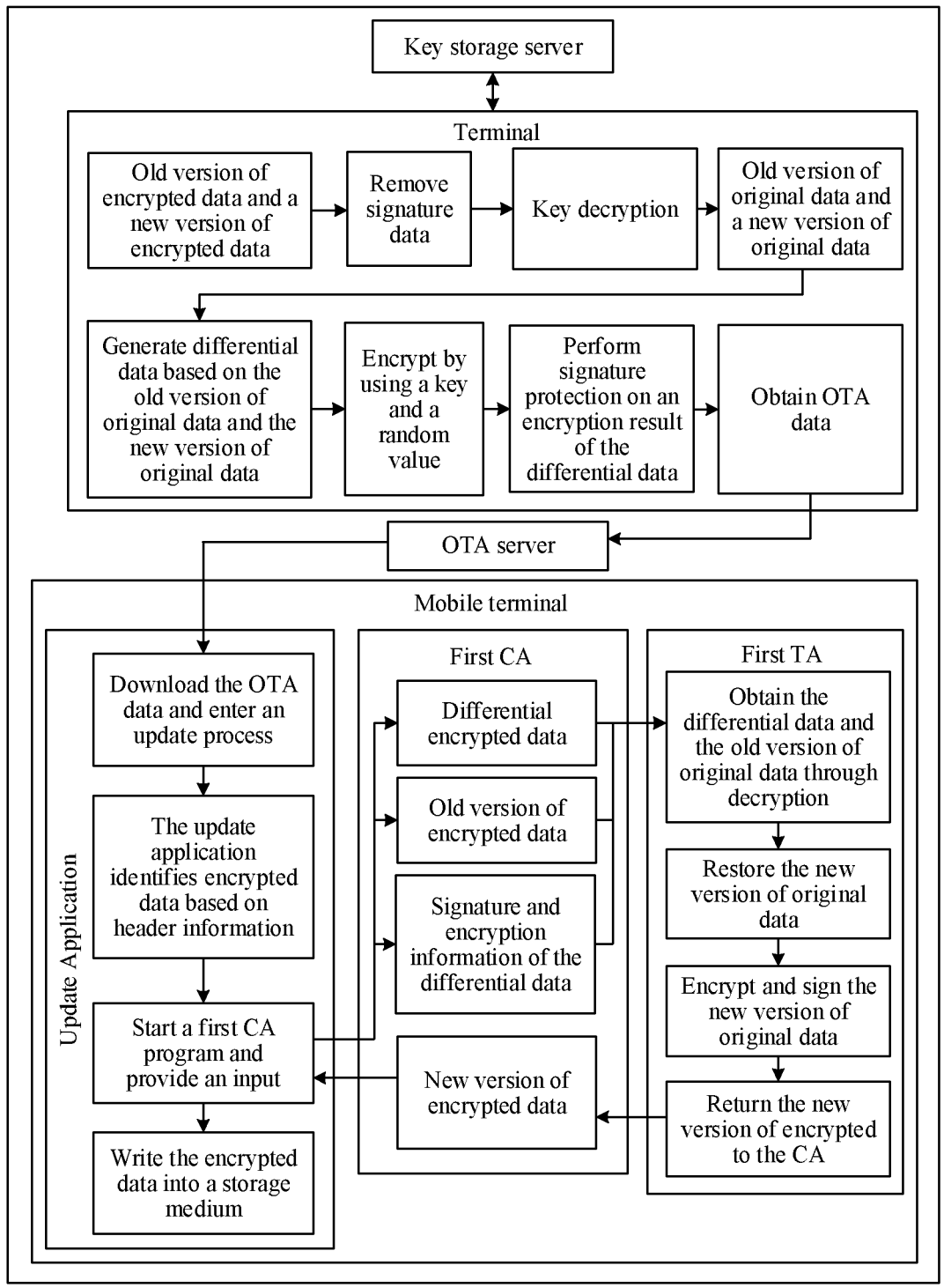
FIG. 5B is a schematic flowchart of an OTA upgrade method according to another embodiment of this application.

In an implementation, FIG. 5B is another flowchart of an OTA upgrade method according to an embodiment of this application. As shown in FIG. 5B, the method is executed by a key storage server, a terminal, an OTA server, and a mobile terminal. The terminal may remove signature data in an old version of encrypted data and signature data in a new version of encrypted data, and obtain a key from the key storage server to obtain an old version of original data and a new version of original data through decryption. Then, the terminal may perform differentiation on the old version of original data and the new version of original data, to generate differential data. Next, the terminal may encrypt the differential data by using the key on the key storage server and an encrypted random value, and perform signature protection on an encrypted result, to obtain OTA data. The terminal may upload the OTA data to the OTA server. The OTA server may send the OTA data to the mobile terminal. After the mobile terminal downloads the OTA data, after an update application on the mobile terminal identifies that the OTA data is encrypted data, a first CA may be started, and differential encrypted data in the OTA data, an old version of encrypted data locally stored in the mobile terminal, and signature information and encryption information of the differential data are forwarded to a first TA by using the first CA. The first TA may decrypt the old version of encrypted data and the differential encrypted data, and restore the new version of original data. The first TA encrypts and signs the new version of original data, to generate the new version of encrypted data, and forwards the new version of encrypted data to the update application by using the first CA. The update application writes the new version of encrypted data to a storage medium.

According to this embodiment of this application, while ensuring security of data in a system software upgrade process, the OTA server can perform differentiation on only the new version of original data and the old version of original data, and remove signature data of the new version of original data from the differential data, so that a size of data transmitted by the OTA server to the mobile terminal for system software upgrade is reduced, and fast upgrade of the system software is implemented.

The following describes the OTA upgrade method shown in FIG. 5A.

In this embodiment of this application, the system software may be ANDROID system software, emotional operating system software (for example, EMUI or MIUI) developed based on an ANDROID system, or the like. The system software may alternatively be system software such as a windows phone, an IOS, or the like. This is not limited herein.

The OTA server may receive a plurality of versions of encrypted data of the system software sent by a terminal of a vendor of the system software, where release dates of the plurality of versions of system software are different. The OTA server may receive current version information that is of the system software on the mobile terminal and that is sent by the mobile terminal. After receiving the current version information, the OTA server determines whether a current version of the system software used on the mobile terminal is the latest version of the release date, and if the current version is not the latest version, the system software of the mobile terminal needs to be upgraded. The OTA server may determine, from the plurality of versions of encrypted data of the system software, an old version of encrypted data corresponding to the current version information and a new version of encrypted data with the latest release date. Using EMUI system software as an example, the OTA server may store version 8.0 of the EMUI system, version 8.1 of the EMUI system, and version 8.2 of the EMUI system that are sent by the terminal of the vendor of the system software. Version 8.2 of the EMUI system has the latest release date, and version 8.2 of the EMUI system has the earliest release date. Version 8.1 of the EMUI system is used on the mobile terminal. After receiving the current version information sent by the mobile terminal, the OTA server may determine that version 8.1 of the EMUI system used on the mobile terminal is not the latest version. The OTA server may perform the OTA upgrade method in this embodiment of this application by using the new version of encrypted data (namely, encrypted data of version 8.2 of the EMUI system) and the old version of encrypted data (encrypted data of version 8.1 of the EMUI system).

The old version of encrypted data may refer to data obtained after source code corresponding to an old version of system software (for example, version 8.1 of the EMUI system) is encrypted and signed. The new version of encrypted data may refer to data obtained after source code corresponding to a new version of system software (for example, version 8.2 of the EMUI system) is encrypted and signed. The source code corresponding to the old version of system software (for example, version 8.1 of the EMUI system) may be referred to as an old version of original data, and the source code corresponding to the new version of system software (for example, version 8.2 of the EMUI system) may be referred to as a new version of original data.

Figure 6A:
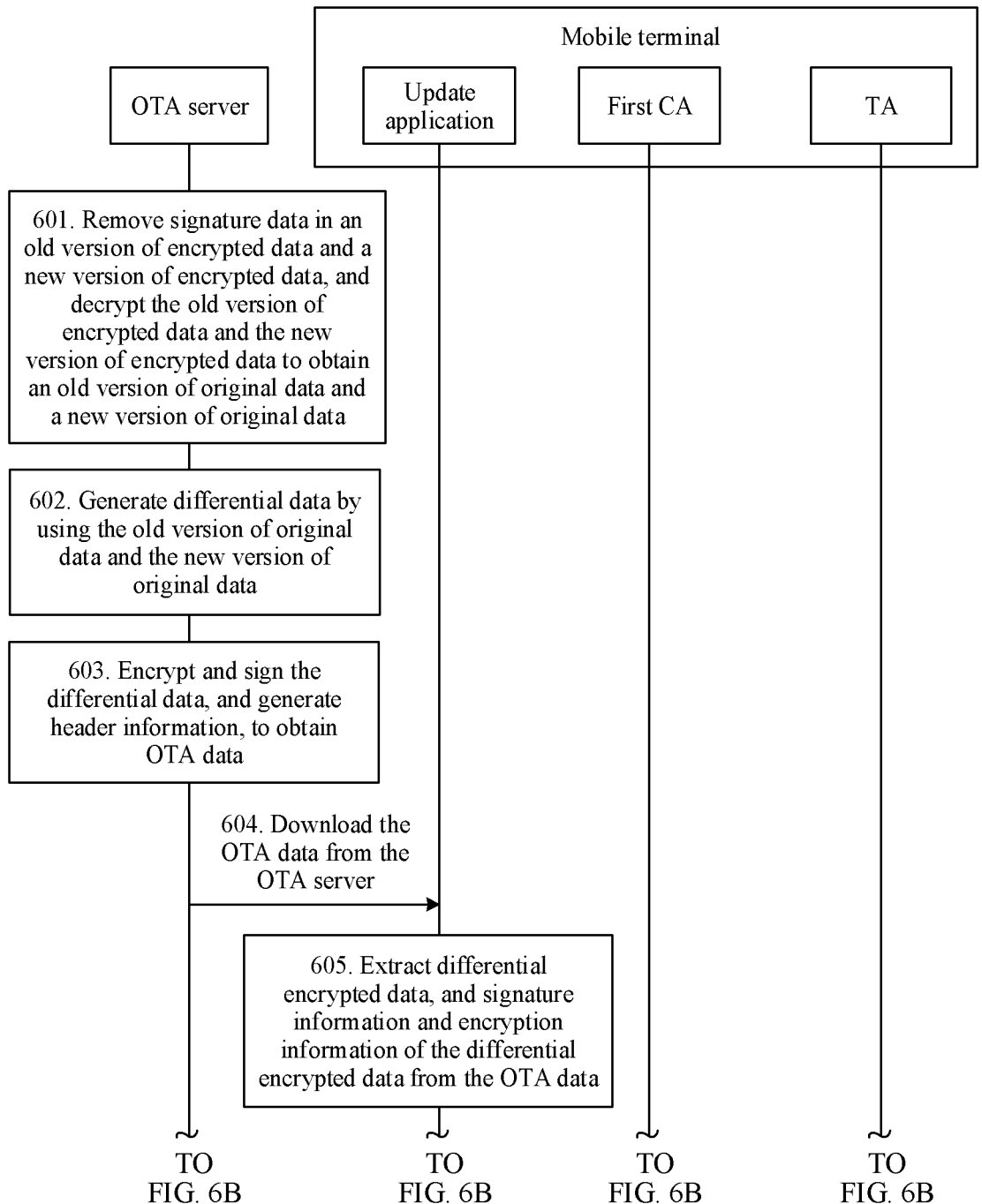
FIG. 6A and FIG. 6B are a schematic flowchart of an OTA upgrade method according to another embodiment of this application.
Figure 6B:
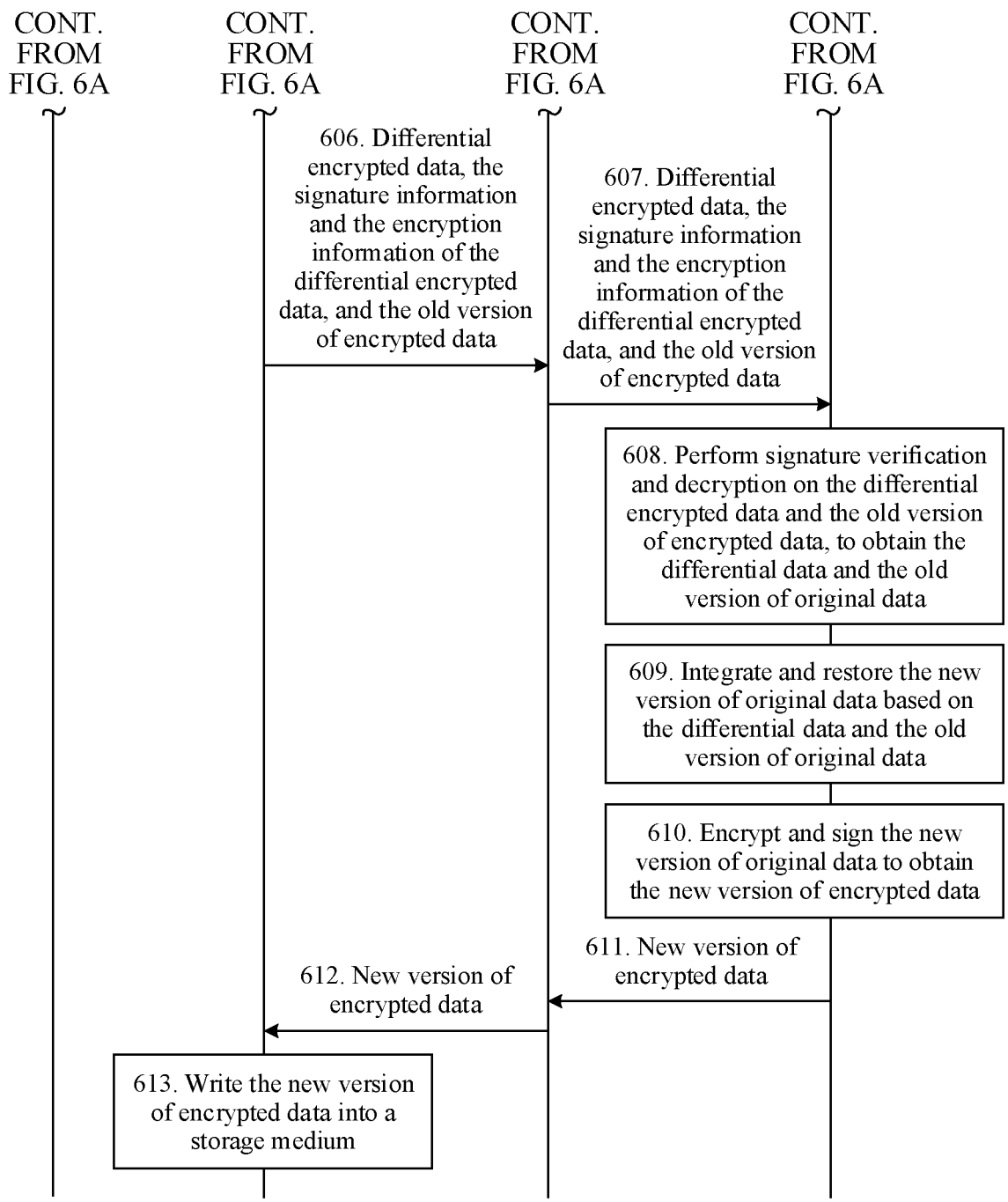

Referring to FIG. 6A and FIG. 6B, FIG. 6A and FIG. 6B are a schematic flowchart of an OTA upgrade method based on the system architecture in FIG. 5A according to an embodiment of this application. In an implementation, when the process of the OTA upgrade method in the embodiment shown in FIG. 6A and FIG. 6B is applied to the system architecture shown in FIG. 5B, step 601 to step 603 in FIG. 6A and FIG. 6B may be performed by the terminal. After step 603 is performed, the terminal may upload the OTA data to the OTA server, and then the mobile terminal may download the OTA data from the OTA server. The OTA server is the OTA server 300 in FIG. 3, and the mobile terminal is the mobile terminal 200 in FIG. 2. As shown in FIG. 6A and FIG. 6B, the method includes the following steps.

601. The OTA server removes signature data in the old version of encrypted data and the new version of encrypted data, and decrypts the old version of encrypted data and the new version of encrypted data to obtain an old version of original data and a new version of original data.

As shown in FIG. 7A, the old version of encrypted data includes an old version of encrypted original data and an old version of signature data. The old version of signature data may include a message digest of the old version of encrypted original data, and a message digest algorithm (for example, a secure hash algorithm 256 (secure hash algorithm 256 (SHA) 256)) for generating the message digest. The OTA server may calculate a check message digest of the old version of encrypted original data by using the message digest algorithm (for example, an SHA 256). The OTA server may determine whether the check message digest is the same as the message digest in the old version of signature data. If the check message digest is the same as the message digest in the old version of signature data, the OTA server may determine that the old version of original data has not been modified and is valid data. In other words, the old version of original data may be used to produce differential data. If the check message digest is different from the message digest in the old version of signature data, the OTA server may determine that the old version of original data has been modified and is invalid data, and the OTA server may delete the invalid data, and request to re-obtain the old version of encrypted data from the terminal of the vendor of the system software until the check message digest is the same as the message digest in the signature data of the old version.

An encryption manner used by the old version of encrypted original data may be a symmetric encryption manner (for example, a data encryption standard (DES) algorithm, an advanced encryption standard (AES) algorithm, or a triple data encryption standard (3DES) algorithm). In other words, a same key (secret key) is used during encryption and decryption.

The OTA server may decrypt the old version of encrypted data by using a first key used during encryption of the old version of encrypted data, to obtain the old version of original data. The first key may be stored on the OTA server, or may be stored on another key storage server. The key storage server may store not only a key of a symmetric encryption manner of the OTA server, but also a pair of private key and public key of an asymmetric encryption manner of the OTA server, and other keys for data encryption or decryption.

As shown in FIG. 7B, the new version of encrypted data may include a new version of encrypted original data and a new version of signature data. The new version of signature data may include a message digest of the new version of encrypted original data encrypted by using a private key, and a message digest algorithm (for example, an SHA 256) for generating the message digest. The OTA server may obtain the message digest of the new version of encrypted original data through decryption by using a public key matching the private key. The OTA server may calculate a check message digest of the new version of encrypted original data by using the message digest algorithm (for example, an SHA 256). If the check message digest is the same as the message digest in the new version of signature data, the OTA server may determine that the new version of original data has not been modified and is valid data. In other words, the new version of original data may be used to produce differential data. If the check message digest is different from the message digest in the new version of signature data, the OTA server may determine that the new version of original data has been modified and is invalid data, and the OTA server deletes the invalid data, and requests to re-obtain the new version of encrypted data from the terminal of the vendor of the system software until the check message digest is the same as the message digest in the new version of signature data.

An encryption manner used by the new version of encrypted original data may be a symmetric encryption manner (for example, a DES algorithm, an AES algorithm, or a 3DES algorithm). In other words, a same key is used during encryption and decryption of the new version of encrypted data.

The OTA server may separate the old version of encrypted original data and the new version of signature data in the new version of encrypted data, and the OTA server may decrypt the new version of encrypted data by using a second key used when the new version of encrypted data is encrypted, to obtain the new version of original data. The second key may be stored on the OTA server, or may be stored on the key storage server. The second key may be the same as or different from the first key.

In an implementation, the sequence of first removing the signature data and then decrypting the signature data shown in FIG. 7A and FIG. 7B is not limited, and the OTA server may first decrypt the old version of encrypted original data in the old version of encrypted data, to obtain the old version of original data and the old version of signature data, and then remove the old version of signature data. The OTA server may first decrypt the new version of encrypted data to obtain the new version of original data and the new version of signature data, and then remove the new version of signature data.

602. The OTA server generates differential data by using the old version of original data and the new version of original data.

Figure 8:
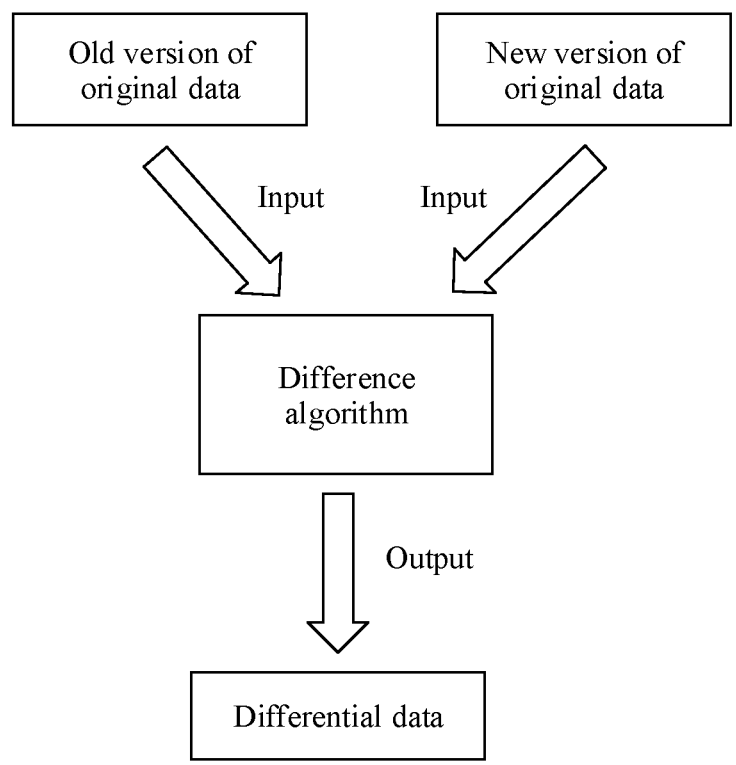
FIG. 8 is a schematic flowchart of producing differential data according to an embodiment of this application.

As shown in FIG. 8, the OTA server may use the old version of original data and the new version of original data as inputs, to perform a difference operation by using a difference algorithm (for example, a bsdiff algorithm or an imgdiff algorithm), and output differential data. A difference manner in which the OTA server performs differentiation by using the old version of original data and the new version of original data may be file-based differentiation, or may be data block-based differentiation.

Using the file-based differentiation as an example, the original data may include one or more data files, such as file_1, file_2, and file_3, and the new version of data may include one or more data files, such as file_1, file_2, file_3, and file_4. A first terminal performs, by using the one or more data files in the original data and the one or more data files in the new version of data, a difference operation by using a difference algorithm (for example, a bsdiff algorithm or an imgdiff algorithm), to obtain a difference file (for example, file_4) in the new version of data, and determines data included in the difference file (for example, file_4) in the new version of data as the differential data.

Using block-based differentiation as an example, the old version of original data may be a mirror (mirroring) (for example, a file in the ".img" format). The mirror of the old version of original data may be divided into a specific quantity (for example, 32768) of fixed-size (for example, 4 kilobytes (kB)) data blocks at a bottom storage layer of a file system. The new version of original data may be a mirror (for example, a file in the ".img" format). The mirror of the new version of data may be divided into a specific quantity (for example, 32768) of fixed-size (for example, 4 kB) data blocks at the bottom storage layer of the file system. The example is merely used to explain this embodiment of this application, and should not constitute a limitation. The OTA server may compare the plurality of data blocks in the old version of original data with the plurality of data blocks in the new version of original data, and perform a difference operation on the plurality of data blocks in the original data and the plurality of data blocks in the new version of data, determine one or more differential data blocks that are in the plurality of data blocks in the new version of original data and that are different from the plurality of data blocks in the old version of original data, and determine data included in the one or more differential data blocks as differential data.

For example, the plurality of data blocks in the new version of original data may be data blocks block 2_0 to block 2_32767, and the plurality of data blocks in the original data may be data blocks block 1_0 to block 1_32767. The differential data blocks that are different from the plurality of data blocks in the old version of original data and that are in the plurality of data blocks in the new version of original data may be data blocks block 2_27001, block 2_27002, block 2_27003, and block 2_22704. The first terminal may determine data included in the data blocks block 2_27001, block 2_27002, block 2_27003, and block 2_27004 as the differential data.

603. The OTA server encrypts and signs the differential data, and generates header information, to obtain OTA data.

Figure 9:
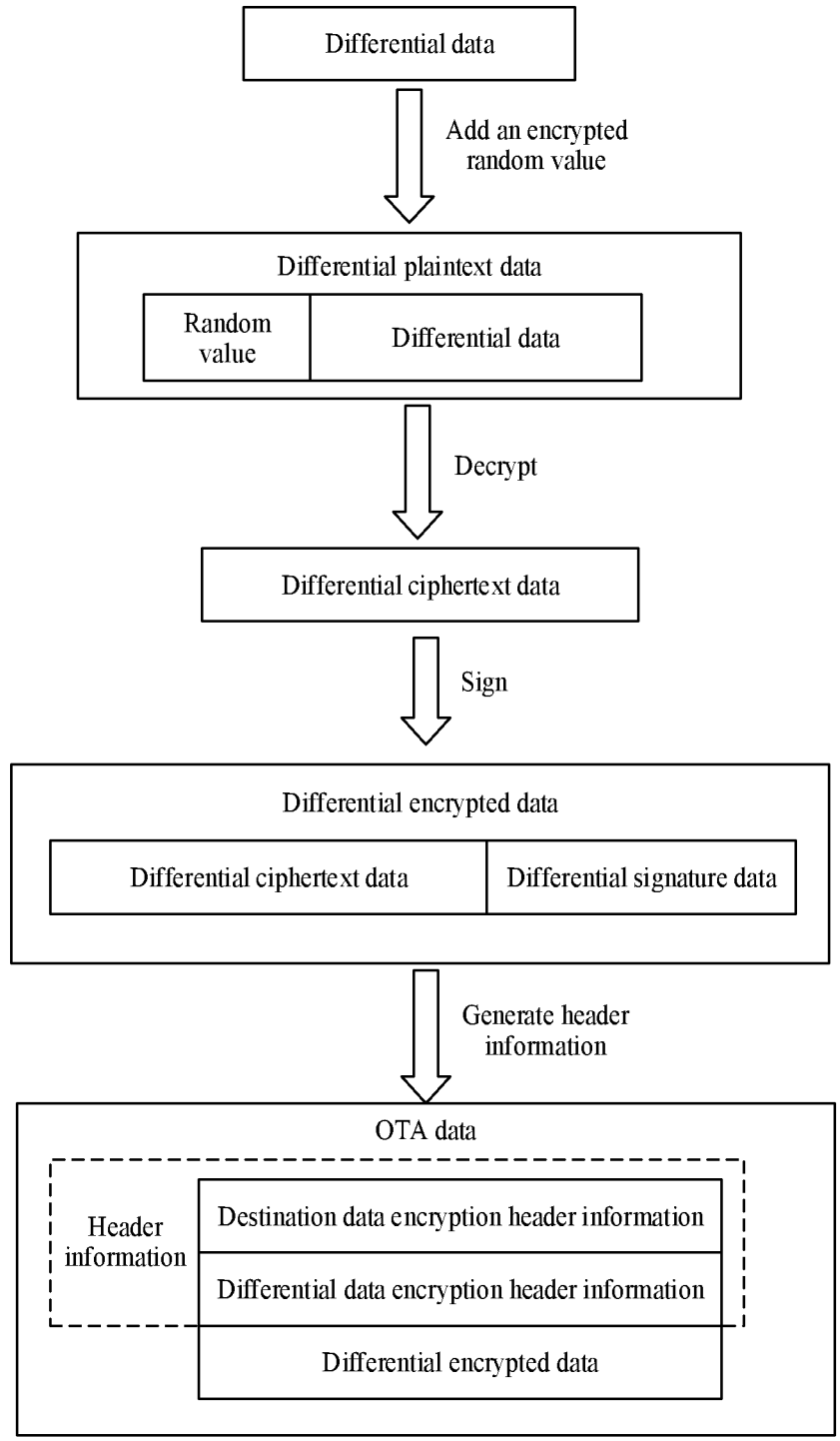
FIG. 9 is a schematic flowchart of producing OTA data according to an embodiment of this application.

As shown in FIG. 9, the OTA server may be at a fixed position of the differential data (for example, at the front of the differential data, in the differential data, or at the tail of the differential data), and insert one or more encrypted random values to generate differential plaintext data. The encrypted random value may be generated by a random number generator on the OTA server, or may be generated in another manner. This is not limited herein.

The OTA server may encrypt, by using a third key, and a symmetric encryption algorithm (for example, a DES algorithm, an AES algorithm, a 3DES algorithm, or an IDEA algorithm), the differential data and the differential plaintext data of the one or more encrypted random values inserted into the differential data, to obtain differential ciphertext data.

The OTA server may sign the differential ciphertext data by using the private key of the OTA server, an asymmetric encryption algorithm (for example, a Rivest-Shamir-Adleman (RSA) algorithm), and an ElGamal encryption algorithm. The private key of the OTA server may be stored locally on the OTA server, or may be stored on the key storage server. A digital signature needs to be verified when the mobile terminal receives the OTA data, to determine validity of the OTA data. Therefore, a public key matching the private key of the OTA server is stored on the mobile terminal.

An RSA digital signature algorithm is used as an example. First, the OTA server calculates a message digest of the differential encrypted data by using a digest algorithm (for example, a message digest algorithm 2 (MD 2), a message digest algorithm 4 (MD 4), a message digest algorithm 5 (MD 5), a secure hash algorithm 1 (SHA 1), a secure hash algorithm 2 (SHA 2), or an SHA 256). Then, the OTA server encrypts the message digest by using the private key of the OTA server, and an RSA algorithm, to obtain a character string obtained after the message digest is encrypted, namely, to obtain a digital signature result of the differential encrypted data.

The header information may include differential data encryption header information and destination data encryption header information. The differential data encryption header information may include information such as encryption algorithm information used when the OTA server encrypts the differential plaintext data (for example, a DES algorithm, an AES algorithm, or a 3DES algorithm), and one or more encrypted random values used by the OTA server before encryption. The third key may be locally stored on the OTA server, or may be stored on the key storage server. The third key may be the same as the first key and the second key, or may be different from the first key and the second key. To decrypt the OTA data to obtain the differential data after the mobile terminal receives the OTA data, the mobile terminal also stores the third key.

The OTA server may generate destination data encryption header information for the differential encrypted data. The destination data encryption header information may include signature verification information (including a check random value), message digest algorithm information (for example, an SHA 256), and asymmetric encryption algorithm information (for example, an RSA algorithm) used when the message digest of the differential encrypted data is encrypted. As shown in FIG. 6A and FIG. 6B, the OTA data may include the differential encrypted data, the differential data encryption header information, and the destination data encryption header information. The destination data encryption header information may be used by the mobile terminal to verify the differential signature data before the mobile terminal restores the new version of original data by using the differential data and the old version of original data. If the verification succeeds, it indicates that the differential encrypted data has not been modified, and the mobile terminal may restore the new version of original data. The differential data encryption header information may be used by the mobile terminal to decrypt the differential encrypted data to obtain differential data. The differential data may be used by the mobile terminal to integrate new version of data.

604. The mobile terminal downloads the OTA data from the OTA server.

The OTA server may communicate with the mobile terminal by using a Hypertext Transfer Protocol Secure (HTTPS). For example, the OTA server and the mobile terminal may establish a secure channel by using a Secure Sockets Layer (SSL) protocol and/or a Transport Layer Security (TLS) protocol, to perform secure data transmission.

605. The update application extracts differential encrypted data, and signature information and encryption information of the differential encrypted data from the OTA data.

Because the OTA data includes the differential encrypted data, the differential data encryption header information, and the destination data encryption header information, the update application may extract encryption information from the differential data encryption header information, and the update application may extract signature information from the destination data encryption header information. The encryption information includes information such as encryption algorithm information of the differential encrypted data (for example, a DES algorithm, an AES algorithm, or a 3DES algorithm) and one or more encrypted random values of the differential encrypted data. The signature information includes signature verification information (including a check random value) of the differential encrypted data, message digest algorithm information (for example, an SHA 256), and asymmetric encryption algorithm information (for example, an RSA algorithm) used for signature.

606. The update application starts the first CA, and sends the differential encrypted data, the signature information and the encryption information of the differential encrypted data, and the old version of encrypted data of the system software to the first CA.

Both the update application and the first CA are CAs in an REE OS of the mobile terminal. The old version of encrypted data of the system software on the mobile terminal may be data obtained after source code corresponding to the old version of system software on the mobile terminal (for example, version 8.1 of the EMUI system) is encrypted and signed by the mobile terminal. The source code corresponding to the old version of system software (for example, version 8.1 of the EMUI system) included in the old version of encrypted data of the system software is the same as source code corresponding to the old version of system software included in the old version of encrypted data. The source code corresponding to the old version of the system software (for example, version 8.1 of the EMUI system) may be referred to as an old version of original data, and the source code corresponding to the new version of the system software (for example, version 8.2 of the EMUI system) may be referred to as the new version of original data.

Figure 10A:
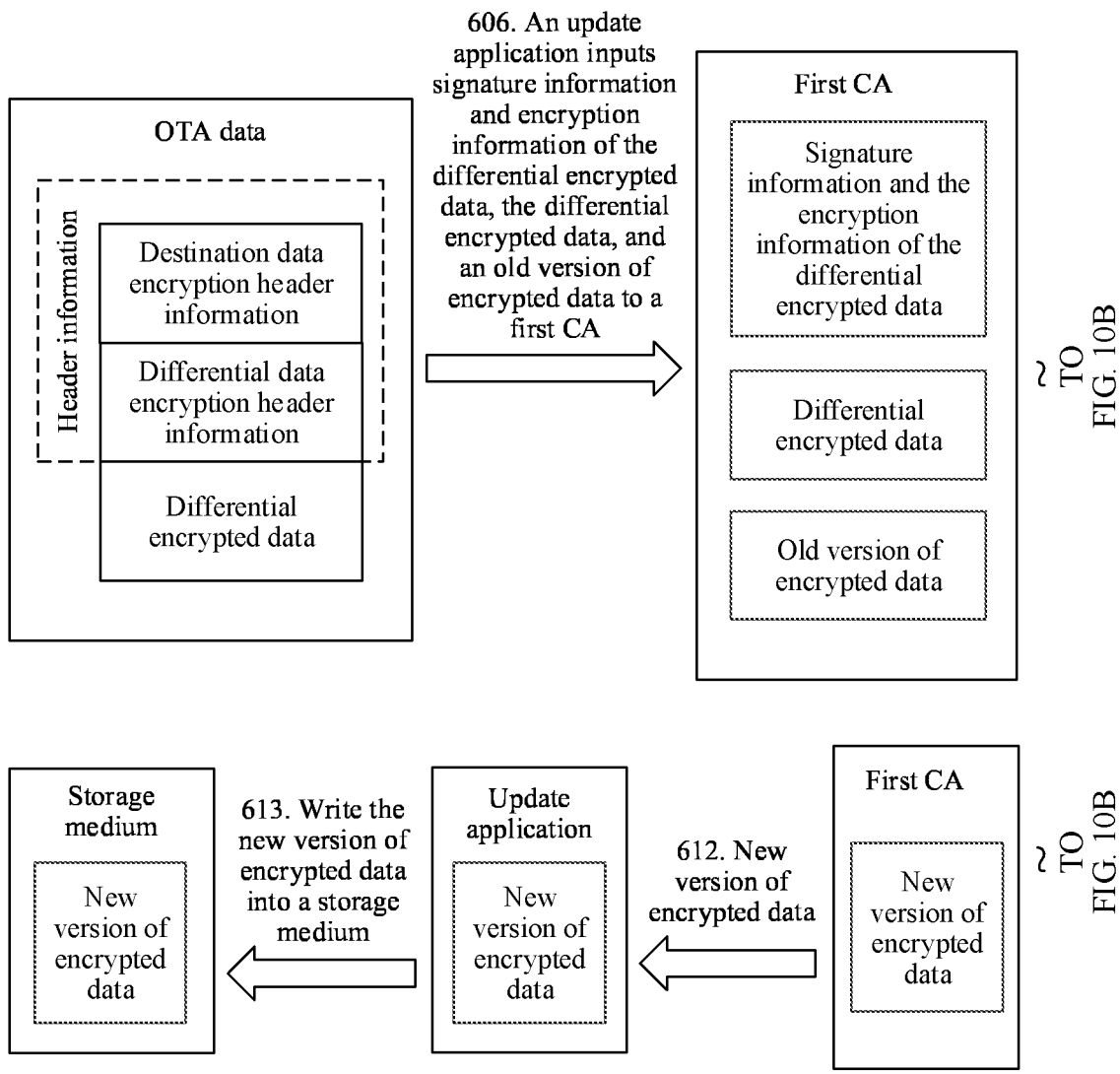
FIG. 10A and FIG. 10B are a schematic flowchart of upgrading system software by a mobile terminal according to an embodiment of this application.
Figure 10B:
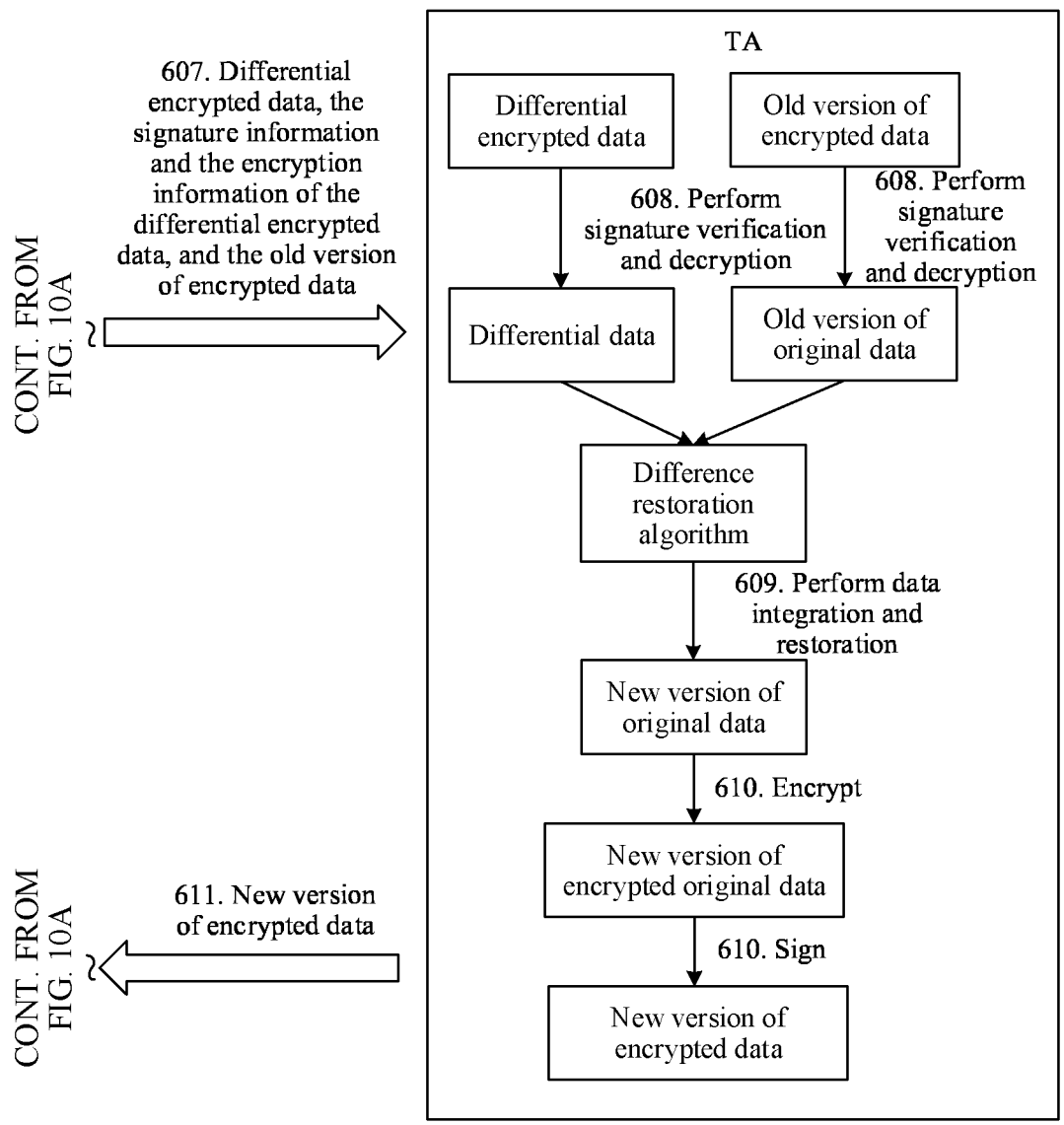

As shown in FIG. 10A and FIG. 10B, the OTA data downloaded by the mobile terminal from the OTA server may include header information and differential encrypted data. The header information includes destination data encryption header information and differential data encryption header information. The destination data encryption header information includes signature data of the differential encrypted data, and the differential data encryption header information includes encryption information of the differential encrypted data. The update application may identify, based on the header information of the OTA data, that the OTA data is encrypted data.

607. The first CA forwards the differential encrypted data, the signature information and the encryption information of the differential encrypted data, and the old version of encrypted data of the system software to a TA in a TEE OS.

608. The TA performs signature verification and decryption on the differential encrypted data and the old version of encrypted data of the system software, to obtain the differential data and the old version of original data.

As shown in FIG. 10A and FIG. 10B, after the TA receives the differential encrypted data, the signature information and the encryption information of the differential encrypted data, and the old version of encrypted data of the system software forwarded by the first CA, the TA may verify a signature of the differential encrypted data. For example, the mobile terminal locally stores a public key of the OTA server. The TA may decrypt the differential signature data by using the public key of the OTA server to obtain the message digest of the differential ciphertext data. The TA may calculate a check message digest of the differential ciphertext data by using the message digest algorithm (for example, an SHA 256). If the check message digest is the same as the message digest obtained through decryption by using the public key, the differential ciphertext data has not been modified, and the signature verification succeeds. The TA may use the differential ciphertext data to integrate the new version of original data. If the check message digest is different from the message digest obtained through decryption by using the public key, the differential ciphertext data has been modified, and the signature verification fails. The mobile terminal re-downloads the OTA data from the OTA server until verification of the differential signature data in the differential encrypted data succeeds.

In an implementation, before the mobile terminal downloads the OTA data from the OTA server, the old version of encrypted data of the system software stored on the mobile terminal is data obtained after the TA encrypts the old version of original data and signs the old version of original data by using a private key of the mobile terminal. After receiving the differential encrypted data, the signature information and the encryption information of the differential encrypted data, and the old version of encrypted data of the system software forwarded by the first CA, the TA may first verify the signature of the old version of encrypted data of the system software by using the public key of the mobile terminal. After the signature verification succeeds, the TA decrypts the old version of encrypted data of the system software to obtain the old version of original data. For example, the TA may obtain the message digest of the old version of encrypted data of the system software by using the public key of the mobile terminal and an asymmetric decryption algorithm (for example, an RSA algorithm). Then, the TA may recalculate the check message digest of the old version of encrypted data of the system software by using the message digest algorithm (for example, an SHA 256) used for signature. If the check message digest of the old version of encrypted data of the system software is the same as the message digest of the old version of encrypted data of the system software obtained through decryption by using the public key, the differential encrypted data has not been modified, and the signature verification succeeds.

After the signature verification of the TA on the differential encrypted data and the old version of encrypted data of the system software succeeds, the TA may decrypt the differential encrypted data and the old version of encrypted data of the system software, to obtain the differential data and the old version of original data.

For example, the TA decrypts the differential data. The TA may decrypt the differential encrypted data by using the third key used when the OTA server encrypts the differential data, an encryption algorithm (for example, a DES algorithm) in the encryption information, and a random value, to obtain the differential data. The third key may be preset in the mobile terminal, or may be sent by the OTA server by using a secure transmission channel. This is not limited herein.

For example, the TA decrypts the old version of encrypted data of the system software. The TA may decrypt the old version of encrypted data of the system software by using a fourth key and a preset encryption and decryption algorithm (for example, an AES algorithm), to obtain the old version of original data. The fourth key is preset in the mobile terminal, and the fourth key may be the same as or different from the third key. In an implementation, when the TA encrypts or decrypts the data stored locally in the mobile terminal, the TA may perform chip encryption or chip decryption. For the old version of encrypted data of the system software, the TA may decrypt the old version of encrypted data of the system software in a chip encryption/decryption manner, to obtain the old version of original data.

609. The TA integrates and restores the new version of original data based on the differential data and the old version of original data.

The TA may perform data integration by using a difference restoration algorithm (for example, a bspatch algorithm) based on the differential data and the old version of original data, to restore the new version of original data. The new version of original data is complete data obtained after the system software is updated.

610. The TA encrypts and signs the new version of original data to obtain the new version of encrypted data.

As shown in FIG. 10A and FIG. 10B, the TA may encrypt the new version of original data. The TA may encrypt the new version of original data by using a fifth key stored in the TEE, a random value (for example, a power-on password of the mobile terminal) stored in the TEE, and a preset encryption algorithm (for example, an AES algorithm). In an implementation, the TA may further encrypt the new version of original data in a chip encryption/decryption manner, to generate the new version of encrypted original data. For example, the fifth key may be a secure storage key (SSK). For example, values of SSKs in different mobile terminal devices are different. When the TEE starts, a chip identifier (ID) and a hardware unique key (HUK) are used to obtain the value of the SSK through calculation by using a hash-based message authentication code (HMAC). Both the HUK and the chip ID are preset in a chip of the mobile terminal, or may be other keys such as a trusted application storage key (TASK). This is not limited herein.

In an implementation, after the TA encrypts the new version of original data to obtain the new version of encrypted original data, the TA may further sign the new version of encrypted original data, to obtain the new version of encrypted data. The TA may sign the new version of encrypted original data by using the private key of the mobile terminal and an asymmetric encryption algorithm (for example, an RSA algorithm, an ElGamal encryption algorithm, and a DSA algorithm). The key used by the TA to sign the new version of encrypted original data may alternatively be an SSK. For example, values of SSKs in different mobile terminal devices are different. When the TEE starts, a chip ID and a HUK are used to obtain the value of the SSK through calculation by using a HMAC. Both the HUK and the chip ID are preset in a chip of the mobile terminal, or other keys such as a TASK. This is not limited herein.

An RSA digital signature algorithm is used as an example. First, the TA calculates the message digest of the new version of encrypted original data by using a digest algorithm (for example, an MD 2, an MD 4, an MD 5, an SHA 1, an SHA 2, or an SHA 256). Then, the TA encrypts the message digest by using the private key of the mobile terminal and an RSA algorithm, to obtain a character string obtained after the message digest is encrypted, namely, to obtain a digital signature result of the new version of encrypted original data. The TA may generate the new version of encrypted data based on the digital signature result and the new version of encrypted original data.

611. The TA sends the new version of encrypted data to the first CA. 612. The first CA forwards the new version of encrypted data to the update application. 613. After receiving the new version of encrypted data sent by the first CA, the update application may write the new version of encrypted data into the storage medium.

The first CA may forward the new version of encrypted data to the update application. The update application may delete the old version of encrypted data in a storage partition corresponding to the system software, and write the new version of encrypted data into the storage medium of the mobile terminal (for example, a system partition of a read-only memory (ROM)) to complete update and upgrade of the system software from the old version to the new version.

In this embodiment of this application, system software is upgraded by using an OTA. When producing the OTA data, the OTA server may first remove signature data of the encrypted data (namely, the old version of encrypted data and the new version of encrypted data) and decrypt the encrypted data. Then, the differential data is produced based on the old version of original data and the new version of original data of the system software that are obtained through decryption, and the OTA data including the differential data is sent to the mobile terminal. After receiving the OTA data, the mobile terminal may restore the new version of original data based on the locally stored old version of original data of the system software and the differential data in the OTA data, and encrypt and sign the new version of original data by using a TA in a TEE of the mobile terminal. In this way, because the OTA server performs differentiation on only the new version of original data and the old version of original data, the signature data of the new version of original data is removed from the differential data, so that a size of data transmitted by the OTA server to the mobile terminal for system software upgrade is reduced, and fast upgrade of the system software is implemented.

In an implementation, step 609 of integrating and restoring the new version of original data based on the differential data and the old version of original data in FIG. 6A and FIG. 6B may be performed by the first CA.

Figure 11A:
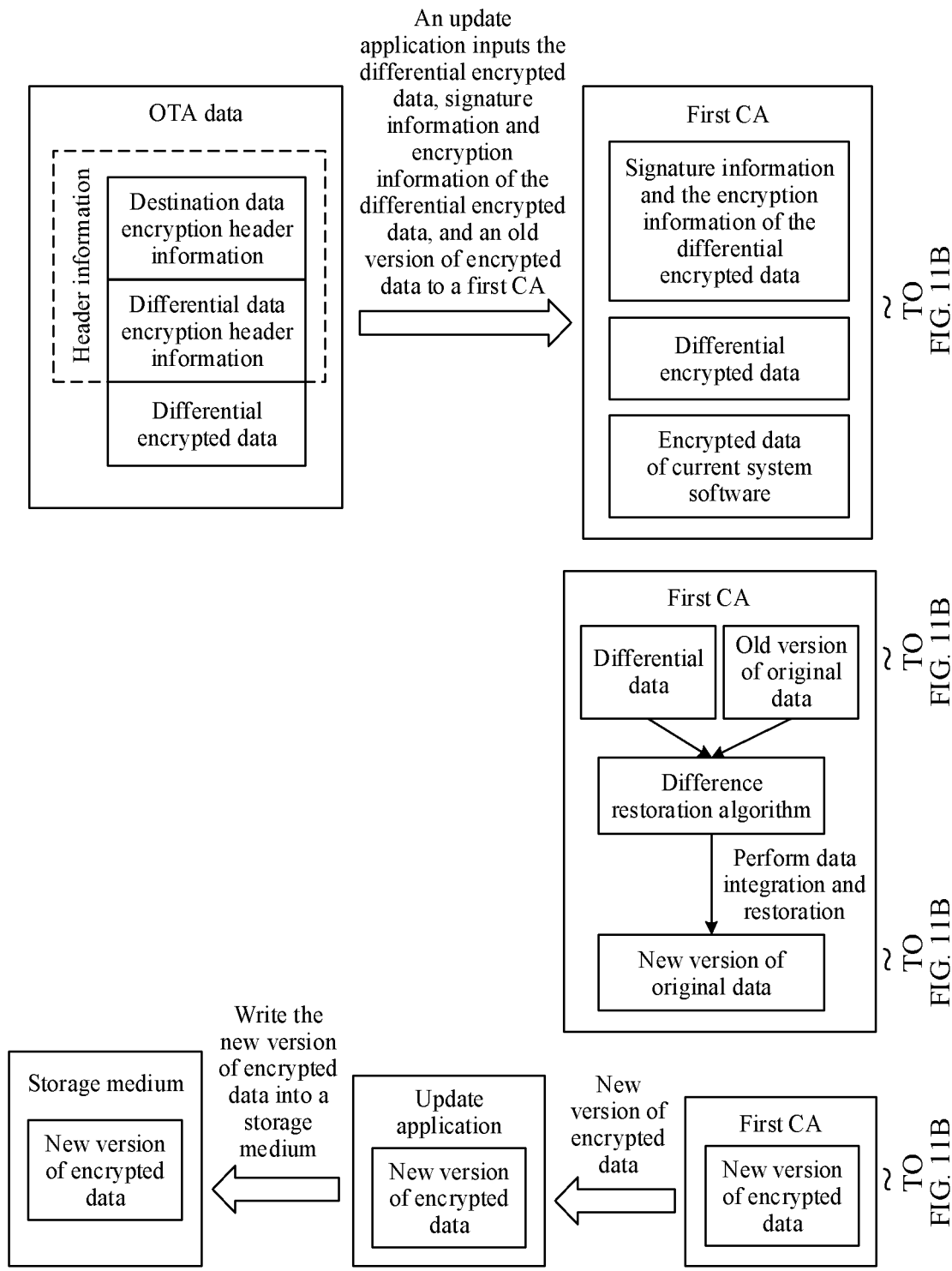
FIG. 11A and FIG. 11B are a schematic flowchart of upgrading system software by a mobile terminal according to another embodiment of this application.
Figure 11B:
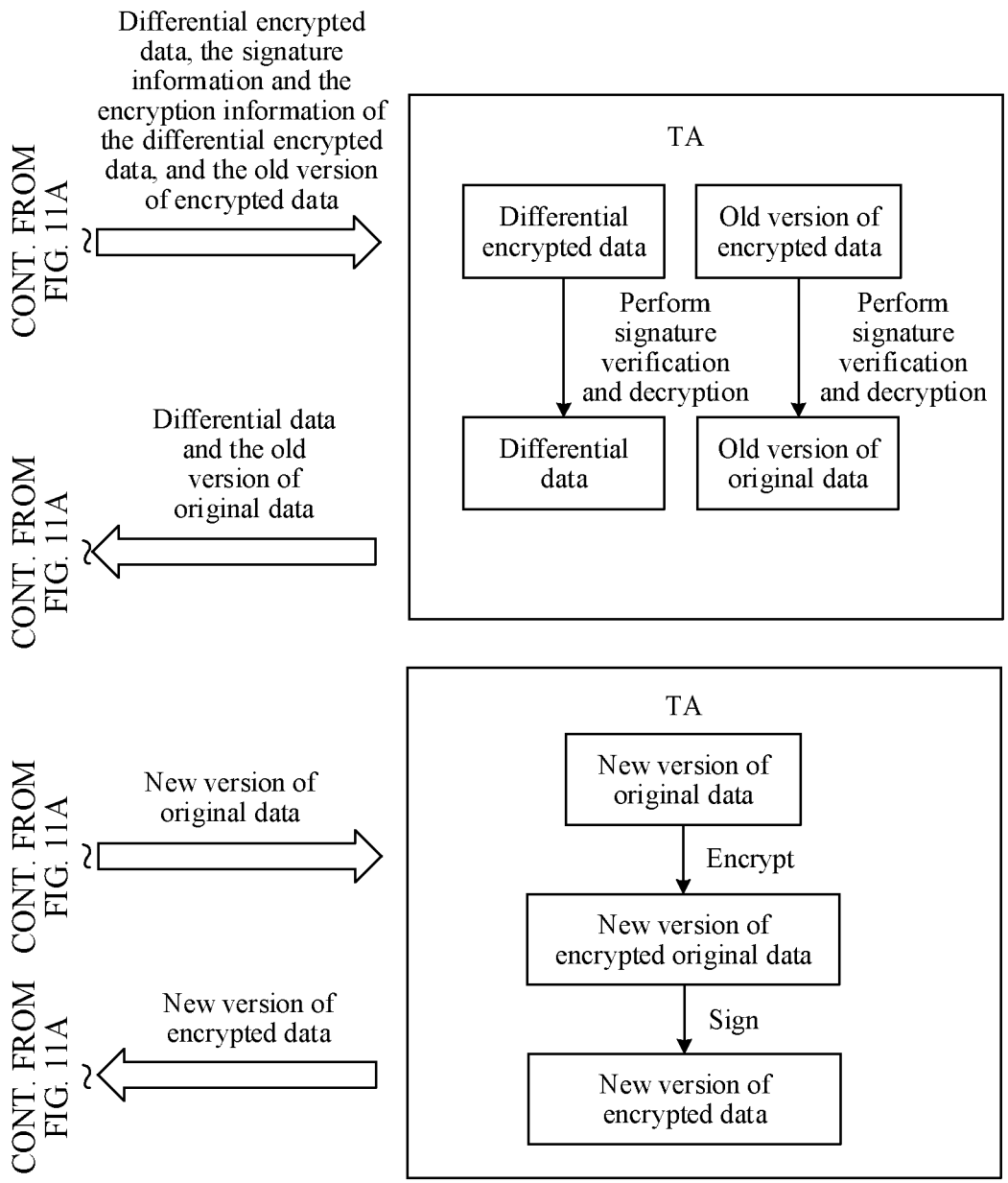

As shown in FIG. 11A and FIG. 11B, the update application may send the signature data and the encryption information of the differential encrypted data, the differential encrypted data, and the old version of encrypted data of the system software of the mobile terminal to the first CA. The first CA may forward the signature data and the encryption information of the differential encrypted data, the differential encrypted data, and the old version of encrypted data of the mobile terminal system software to the TA. The TA may verify the signature of the differential encrypted data and the signature of the old version of encrypted data of the system software. After the signature verification succeeds, the TA may decrypt the differential encrypted data to obtain the differential data, and decrypt the old version of encrypted data of the system software to obtain the old version of original data. The TA may transmit the differential data and the old version of data to the first CA.

The first CA may integrate and restore the new version of original data by using a difference restoration algorithm (for example, a bspatch algorithm) based on the differential data and the old version of original data. The new version of original data is complete data obtained after the system software is updated. The first CA may send the new version of original data to the TA.

The TA may encrypt the new version of original data (for example, by using an AES) to obtain the new version of encrypted original data. The TA may sign the new version of encrypted original data by using an asymmetric encryption algorithm (for example, an RSA algorithm, an ElGamal encryption algorithm, and a DSA algorithm) to generate the new version of encrypted data. The new version of encrypted data includes the new version of encrypted original data and a signature result of the new version of encrypted original data. The TA may send the new version of encrypted data to the first CA.

The first CA may forward the new version of encrypted data to the update application. The update application may write the new version of encrypted data into the storage medium of the mobile terminal (for example, a system partition of a ROM), to complete update and upgrade of the system software.

According to this embodiment of this application, a process of restoring the new version of original data by using a difference restoration algorithm (for example, a bspatch algorithm) based on the differential data and the old version of original data is performed by a CA in an REE of the mobile terminal. The CA may share a part of a data processing task of the TA, so that security of data in system software update can be ensured, and a speed of system software update on the mobile terminal can be improved.

The following describes an implementation of step 601 to step 602 shown in FIG. 6A and FIG. 6B in this embodiment of this application.

When the OTA server or a file system of the mobile terminal stores data of the system software, a system mirror (for example, a mirror in an ext4 format) may be first generated from the data of the system software, and then, the file system may divide the system mirror into fixed-size (for example, 4 kB) data blocks, and generate a hash tree for the system mirror.

Figure 12:
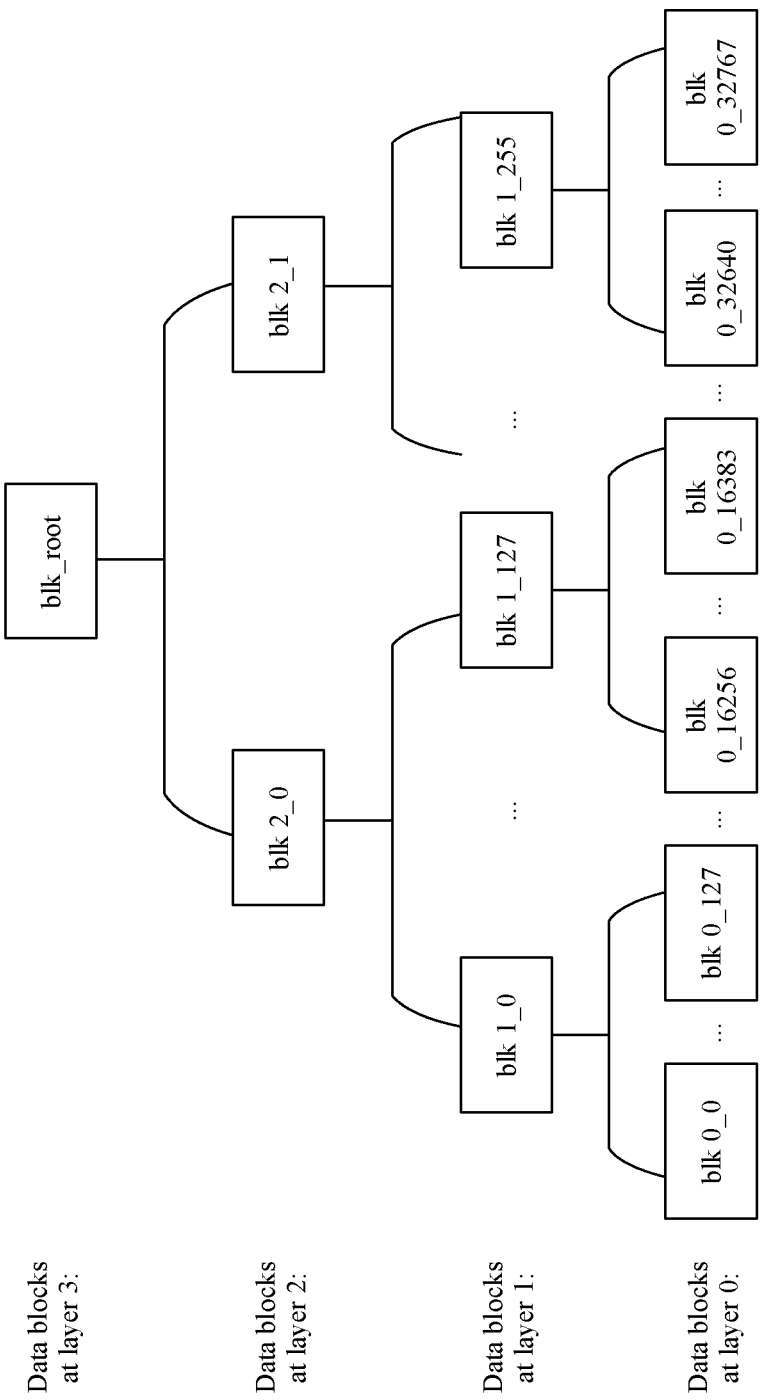
FIG. 12 is a schematic flowchart of generating a hash data block according to an embodiment of this application.

For example, for a process of generating the hash tree for the system mirror by the file system, refer to FIG. 12. As shown in FIG. 12, the file system divides the system mirror into 4 kB data blocks (for example, data blocks blk 0_0 to blk 0_32767) at layer 0. The file system may select a check random value (for example, a hexadecimal encoded value), and calculate, by using a hash algorithm (for example, an SHA 256), hash values obtained after all data blocks at layer 0 are added to the check random value. These hash values are combined into 4 kB data blocks to form layer 1. For example, the data blocks at layer 1 may include data blocks blk 1_0 to blk 1_255. Next, the file system calculates, by using the same hash algorithm (for example, an SHA 256), hash values obtained after all data blocks at layer 1 are added to the check random value, and fills a data block (for example, a data block blk 2_0 to a data block blk 2_1) at layer 2 with a hash value of each data block at layer 1, until hash values of all data blocks in the previous layer may be put into one data block (for example, data block blk_root). In this case, a process of generating a hash tree is completed. The final data block is a root hash data block of the hash tree, and the root hash data block includes a root hash value of the hash tree. If a data block at a layer cannot be filled exactly by the hash values of the previous layer, "0" may be filled in the data block to obtain the required size of 4 kB. To generate a hash tree, data blocks at layer 2 need to be combined above data blocks at layer 1, data blocks at layer 3 need to be combined above the data blocks at layer 2, and so on, until the top layer is the root hash data block (for example, blk_root). The file system may perform an encrypted signature on the root hash data block by using an asymmetric encryption algorithm (for example, an RSA algorithm) and a preset private key, to obtain a signature result. The file system may write the data block included in the hash tree into a corresponding logical storage partition (for example, a system partition) that is stored in the storage medium together with a mirror of the system software.

Therefore, when storing data of the system software, the file system stores a system mirror (for example, data in data blocks at layer 0), a hash tree, a signature result, and a check random value together into a corresponding logical storage partition (for example, a system partition) in the storage medium. The logical storage partition may include three types of data blocks: a zero-only data block, a file data block, and a non-zero non-file data block. The zero-only data block may be a data block that is in the logical storage partition and that is not filled with data. The file data block may be a data block corresponding to the system mirror, for example, a data block at layer 0 shown in FIG. 12. The non-zero non-file data block may include data blocks (for example, data blocks at layer 1 to layer 2 shown in FIG. 12) corresponding to a hash tree and data blocks corresponding to the signature result.

When the OTA server produces differential data in a block-based differentiation manner, because a system mirror in the old version of encrypted data is different from a system mirror in the new version of encrypted data, a hash data block corresponding to the hash tree in the old version of encrypted data is also different from a hash data block corresponding to the hash tree in the new version of encrypted data. If the OTA server performs a difference operation on all non-zero data blocks (including file data blocks and non-zero non-file data blocks) in the old version of encrypted data and all non-zero data blocks (including file data blocks and non-zero non-file data blocks) in the new version of encrypted data, when the OTA server generates the OTA data, because the non-zero non-file data block includes a hash data block and a check data block, the OTA data includes a data volume in the hash data block. In this way, a total data volume of the OTA data is increased, which does not facilitate system software update on the mobile terminal.

Therefore, the following describes a process of producing OTA data in a block-based differentiation manner according to an embodiment of this application. When the OTA server produces differential data, data blocks corresponding to a hash tree are removed, and a new version of check data block is retained. Then, when restoring the differential data, the mobile terminal generates, by using a restored new version of original data and a check random value in the new version of check data block, a hash data block corresponding to the new version of original data, and stores the hash data block into the storage medium. Because the hash data block is removed from the OTA data, and the hash data block is generated on the mobile terminal instead, a data volume of system software update data (OTA data) downloaded by the mobile terminal is reduced.

Figure 13A:
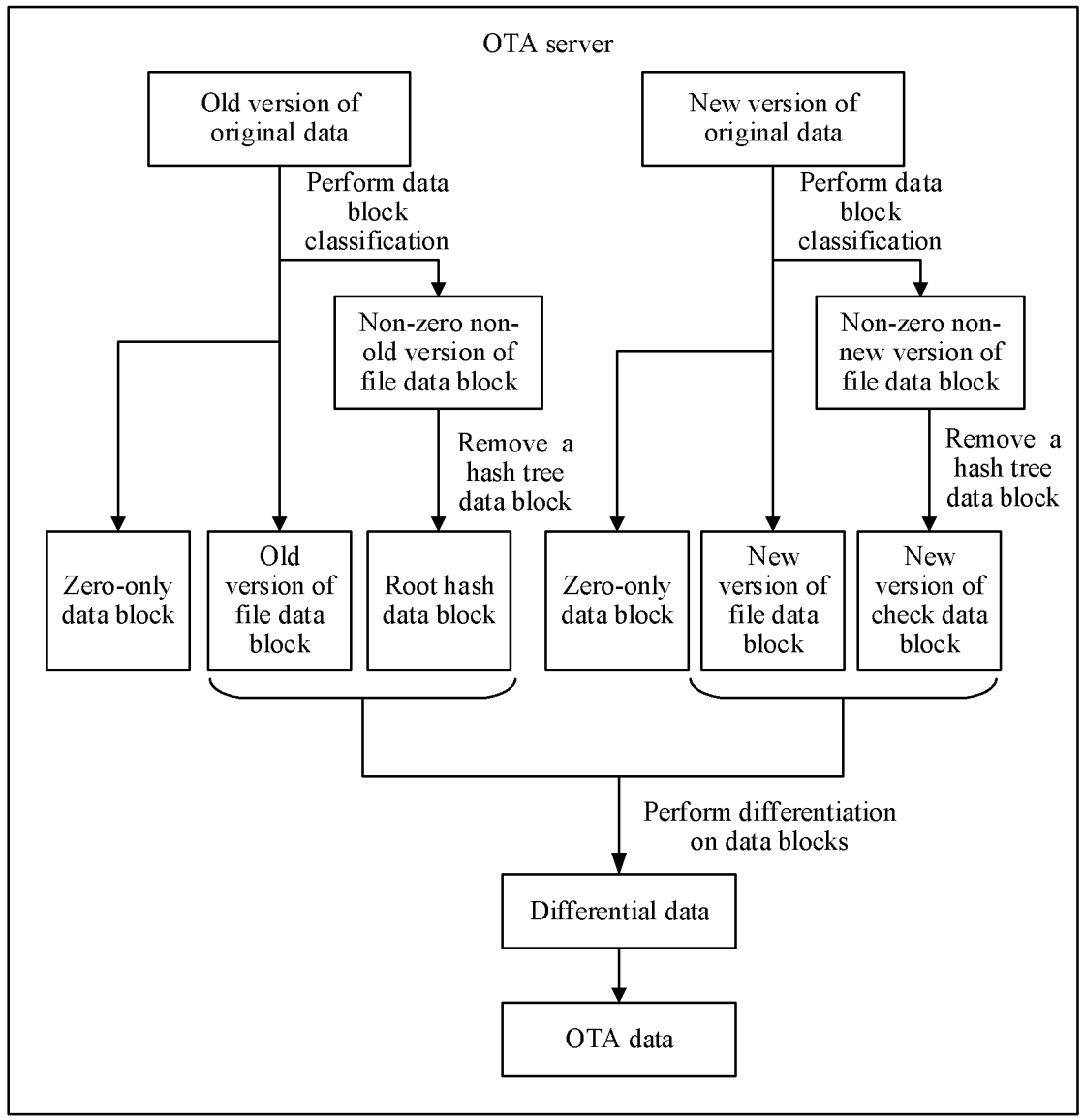
FIG. 13A and FIG. 13B are a schematic flowchart of an OTA upgrade method according to another embodiment of this application.
Figure 13B:
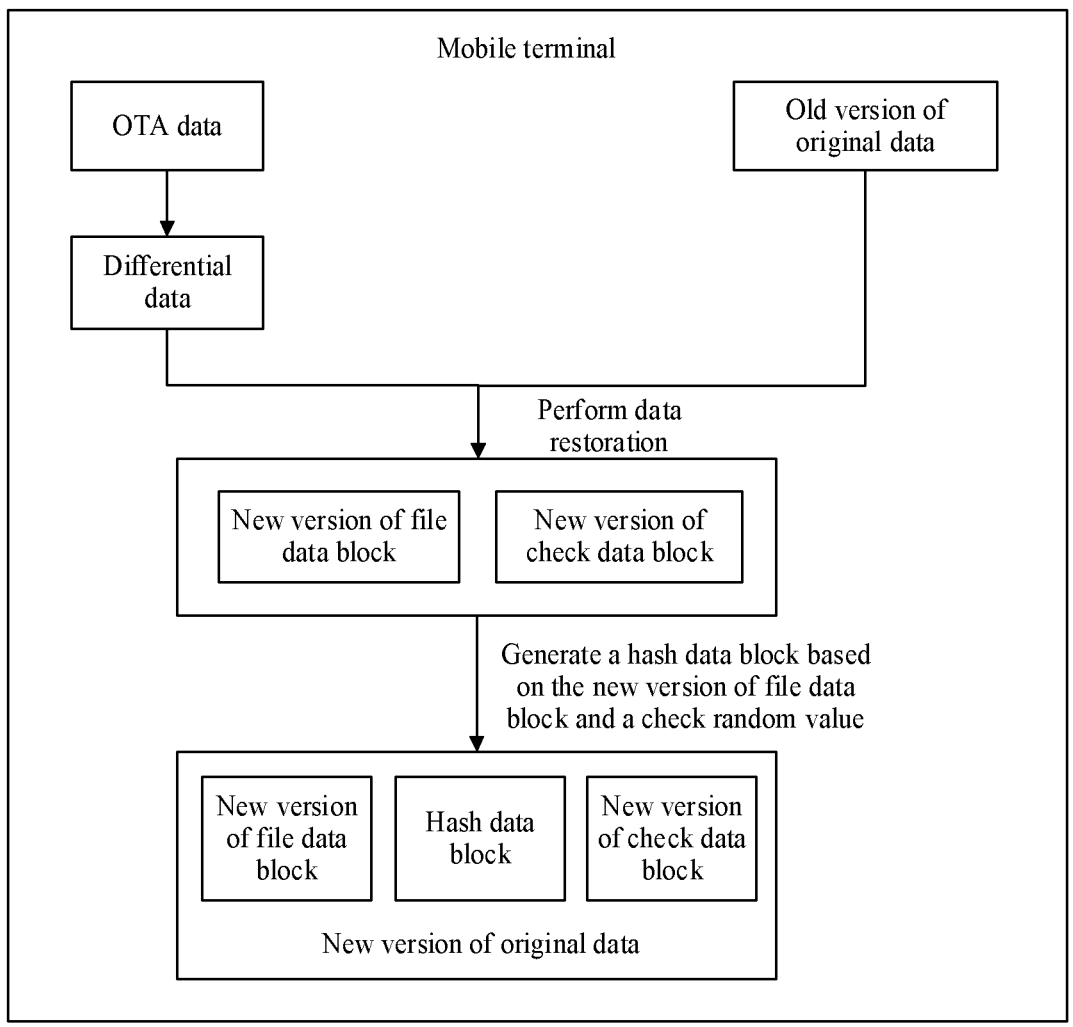

As shown in FIG. 13A and FIG. 13B, the OTA server may classify data blocks in a logical storage partition (for example, a system partition) in which the old version of original data is located into three types: a zero-only data block, an old version of file data block, and a non-zero non-old version of file data block. The non-zero non-old version of file data block may include an old version of hash data block and an old version of check data block. The old version of hash data block is used to store data such as a hash tree of the old version of file data block. The old version of check data block is used to store a check random value used to generate a hash tree of the old version of file data block, and a signature result of the old version of file data block (namely, data obtained after the root hash value is encrypted by using a private key).

Data blocks in a logical storage partition (for example, a system partition) in which the new version of original data is located may be classified into three types: a zero-only data block, a new version of file data block, and a non-zero non-new version of file data block. The non-zero non-new version of file data block may include a new version of hash data block and a new version of check data block. The new version of hash data block is used to store data such as a hash tree of the new version of file data block. The new version of check data block is used to store a check random value used to generate a hash tree of the new version of file data block, and a signature result of the new version of file data block (namely, data obtained after the root hash value is encrypted by using a private key).

The OTA server may remove the old version of hash data block from the non-zero non-old version of file data block, and retain the old version of check data block. The OTA server may remove the new version of hash data block from the non-zero non-new version of file data block, and retain the new version of check data block.

The OTA server may perform data block differentiation on the new version of file data block, the new version of check data block, the old version of file data block, and the old version of check data block in a data block-based differentiation manner, to generate differential data. The data block differentiation on the old version of original data and the new version of original data is performed based on the data block-based differentiation manner, to generate the differential data. The differential data includes a data block that is different from the old version of original data from which the old version of hash data block is removed and that is in the new version of original data from which the new version of hash data block is removed. The new version of check data block is different from the old version of check data block. Therefore, the differential data includes a data block that is different from the old version of file data block and that is in the new version of file data block, and the new version of check data block.

The OTA server may generate OTA data based on the differential data, and send the OTA data to the mobile terminal. The OTA server may send the OTA data to the mobile terminal in a wireless communication manner such as WI-FI network communication or base station communication.

After receiving the OTA data, the mobile terminal may parse the differential data from the OTA data. The mobile terminal may restore, by using a difference restoration algorithm (for example, a bspatch algorithm), a new version of file and data block and the new version of check data block based on the differential data and the old version of original data locally stored in the mobile terminal. Because the new version of check data block includes the check random value used to generate a hash tree of the new version of file data block, the mobile terminal may generate the hash tree of the new version of file data block based on the check random value and the new version of file data block, to obtain the new version of hash data block. For a process of generating the new version of file data block by the mobile terminal, refer to the foregoing embodiment shown in FIG. 12. Details are not described herein again.

After generating the new version of hash data block, the mobile terminal may encrypt the new version of original data including the new version of file data block, the new version of hash data block, and the new version of check data block, and store the new version of original data into a corresponding logical storage partition (for example, a system partition) in the storage medium, to complete update and upgrade of the system software from the old version to the new version.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method implemented by a server, wherein the method comprises:
   obtaining a new version of encrypted data of a system software applied to a mobile terminal and an old version of the encrypted data;
   decrypting the new version of the encrypted data to obtain a new version of original data;
   decrypting the old version of the encrypted data to obtain an old version of the original data;
   performing differentiation on the new version of the original data and the old version of the original data to obtain differential data that comprises data in the new version of the original data that is different from the old version of the original data;
   either encrypting or encrypting and signing the differential data to obtain differential encrypted data;
   generating over-the-air (OTA) data comprising the differential encrypted data and header information, wherein the header information comprises differential data encryption header information or the differential data encryption header information and destination data encryption header information, wherein the differential data encryption header information enables the mobile terminal to decrypt the differential encrypted data to obtain the differential data, and wherein the destination data encryption header information enables the mobile terminal to verify a signature of the differential encrypted data; and
   sending the OTA data to the mobile terminal to upgrade an old version of the system software to a new version of the system software.

2. The method of claim 1, further comprising:
   generating the header information for the differential encrypted data; and
   integrating the differential encrypted data and the header information to obtain the OTA data.

3. The method of claim 1, wherein before obtaining the new version of the encrypted data and the old version of the encrypted data, the method further comprises:
   receiving an old version of information of the system software from the mobile terminal; and
   determining, based on the old version of the information, the old version of the encrypted data from one or more historical versions of encrypted data of the system software.

4. The method of claim 1, further comprising:
   removing signature data from the new version of the encrypted data to obtain a new version of encrypted original data;
   removing the signature data from the old version of the encrypted data to obtain an old version of the encrypted original data;
   decrypting the new version of the encrypted original data to obtain the new version of the original data; and
   decrypting the old version of the encrypted original data to obtain the old version of the original data.

5. The method of claim 1, wherein the old version of the original data comprises an old version of a file data block, an old version of a hash data block, and an old version of a check data block, wherein the new version of the original data comprises a new version of the file data block, a new version of the hash data block, and a new version of the check data block, wherein the old version of the check data block comprises signature data of a root hash value in the old version of the hash data block, wherein the old version of the hash data block enables checking the old version of the file data block, wherein the new version of the check data block comprises signature data of a root hash value in the new version of the hash data block, wherein the new version of the hash data block enables checking the new version of the file data block, and wherein the method further comprises:
   removing the old version of the hash data block from the old version of the original data to obtain an updated old version of the original data;
   removing the new version of the hash data block from the new version of the original data to obtain an updated new version of the original data; and
   performing data block-based differentiation based on the updated old version of the original data and the updated new version of the original data to obtain the differential data.

6. A method implemented by a mobile terminal, wherein the method comprises:
   receiving, from a server, over-the-air (OTA) data comprising header information and differential encrypted data, wherein the header information comprises either differential data encryption header information or the differential data encryption header information and destination data encryption header information, wherein the differential encrypted data is based on encrypting differential data or encrypting and signing the differential data;
   verifying, based on the destination data encryption header information, a signature of the differential encrypted data;
   decrypting the differential encrypted data based on the differential data encryption header information to obtain the differential data;
   obtaining an old version of original data of a system software;
   integrating a new version of the original data based on the differential data and the old version of the original data; and
   upgrading an old version of the system software to a new version of the system software using the new version of the original data.

7. The method of claim 6, wherein before receiving the OTA data, the method further comprises sending an old version of information of the system software to the server to enable the server to determine an old version of encrypted data from one or more historical versions of the encrypted data.

8. The method of claim 6, further comprising:
   running a trusted application (TA) in a trusted execution environment (TEE) of the mobile terminal; and
   running a client application (CA) and an update application in a rich execution environment (REE) of the mobile terminal.

9. The method of claim 8, further comprising:
   extracting, using the update application, the differential encrypted data and the differential data encryption header information from the OTA data, wherein the differential data encryption header information comprises an encryption algorithm of the differential encrypted data and an encrypted random value used during encryption;
   forwarding, using the CA and the update application, the differential encrypted data, the encryption algorithm, and the encrypted random value; and
   decrypting, using the TA, the differential encrypted data based on the differential data encryption header information to obtain the differential data.

10. The method of claim 9, wherein the header information further comprises the differential data encryption header information and the destination data encryption header information, and wherein before integrating the new version of the original data, the method further comprises:
- extracting, using the update application, the destination data encryption header information from the header information, wherein the destination data encryption header information comprises message digest algorithm information of the differential encrypted data and encryption algorithm information used for the signature;
- forwarding, using the update application and the CA, the message digest algorithm information and the encryption algorithm information to the TA;
- verifying, using the TA, the signature of the differential encrypted data based on signature information; and
- further integrating the new version of the original data based on the differential data and the old version of the original data when verification succeeds.

11. The method of claim 9, further comprising further integrating, using the TA, the new version of the original data based on the differential data and the old version of the original data.

12. The method of claim 9, further comprising:
- sending, using the TA, the old version of the original data and the differential data to the CA; and
- further integrating, using the CA, the new version of the original data based on the old version of the original data and the differential data.

13. The method of claim 8, further comprising:
- forwarding, using the update application, an old version of encrypted data of the system software to the TA using the CA; and
- decrypting, using the TA, a current version of the encrypted data to obtain the old version of the original data.

14. The method of claim 8, wherein the old version of the original data comprises an old version of a file data block, an old version of a hash data block, and an old version of a check data block, wherein the old version of the check data block comprises signature data of a root hash value in the old version of the hash data block, wherein the old version of the hash data block enables checking the old version of the file data block, and wherein the method further comprises:
- integrating, using the TA, a new version of the file data block and a new version of the check data block based on the differential data and the old version of the original data;
- calculating, using the TA, a hash tree of the new version of the file data block; and
- generating, using the TA, a new version of the hash data block to obtain the new version of the original data that comprises the new version of the file data block, the new version of the hash data block, and the new version of the check data block, wherein the new version of the check data block comprises signature data of a root hash value in the new version of hash data block, and wherein the new version of the hash data block enables checking the new version of the file data block.

15. A mobile terminal comprising:
- a memory configured to store instructions; and
- a processor coupled to the memory and configured to execute the instructions to cause the mobile terminal to be configured to:
  - receive, from a server, over-the-air (OTA) data comprising header information and differential encrypted data, wherein the header information comprises either differential data encryption header information or the differential data encryption header information and destination data encryption header information, and wherein the differential encrypted data is based on encrypting differential data or encrypting and signing the differential data;
  - verify, based on the destination data encryption header information, a signature of the differential encrypted data;
  - decrypt the differential encrypted data based on the differential data encryption header information to obtain the differential data;
  - obtain an old version of original data of a system software;
  - integrate a new version of the original data based on the differential data and the old version of the original data; and
  - upgrade an old version of the system software to a new version of the system software using the new version of the original data.

16. The mobile terminal of claim 15, wherein the instructions further cause the processor to be configured to send an old version of information of the system software to the server to determine an old version of encrypted data from one or more historical versions of the encrypted data.

17. The mobile terminal of claim 15, wherein the instructions further cause the processor to be configured to:
- run a trusted application (TA) in a trusted execution environment (TEE); and
- run a client application (CA) and an update application in a rich execution environment (REE).

18. The mobile terminal of claim 17, wherein the instructions further cause the processor to be configured to:
- extract, using the update application, the differential encrypted data and the differential data encryption header information from the OTA data, wherein the differential data encryption header information comprises an encryption algorithm of the differential encrypted data and an encrypted random value used during encryption;
- forward, using the CA and the update application, the differential encrypted data, the encryption algorithm, and the encrypted random value to the TA; and
- decrypt, using the TA, the differential encrypted data based on the differential data encryption header information to obtain the differential data.

19. The mobile terminal of claim 18, wherein the header information comprises the differential data encryption header information and the destination data encryption header information, and wherein before integrating the new version of the original data, the instructions further cause the processor to be configured to:
- extract, using the update application, the destination data encryption header information from the header information, wherein the destination data encryption header information comprises message digest algorithm information of the differential encrypted data and encryption algorithm information used for signature;
- forward, using the update application and the CA, the message digest algorithm information and the encryption algorithm information to the TA;
- verify, using the TA, the signature of the differential encrypted data based on signature information; and
- further integrate the new version of the original data based on the differential data and the old version of the original data when verification succeeds.

20. The mobile terminal of claim 17, wherein the instructions further cause the processor to be configured to:
   forward, using the update application and the CA, an old version of the encrypted data to the TA; and
   decrypt, using the TA, a current version of the encrypted data to obtain the old version of the original data.

* * * * *